(12) United States Patent
Kong

(10) Patent No.: US 7,119,794 B2
(45) Date of Patent: Oct. 10, 2006

(54) CHARACTER AND TEXT UNIT INPUT CORRECTION SYSTEM

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 10/427,430

(22) Filed: Apr. 30, 2003

(65) Prior Publication Data

US 2004/0217944 A1 Nov. 4, 2004

(51) Int. Cl.
*G09G 5/00* (2006.01)

(52) U.S. Cl. ............... 345/168; 345/157; 345/173

(58) Field of Classification Search ............... 345/157, 345/168, 173, 156, 169; 715/530, 533; 400/485, 400/486, 489; 341/22, 23, 33
See application file for complete search history.

(56) References Cited

U.S. PATENT DOCUMENTS

| | | | | |
|---|---|---|---|---|
| 4,121,204 A | * | 10/1978 | Welch et al. | ............... 345/174 |
| 4,369,439 A | * | 1/1983 | Broos | ............... 345/168 |
| 4,823,634 A | * | 4/1989 | Culver | ............... 345/168 |
| 4,974,183 A | * | 11/1990 | Miller | ............... 345/168 |
| 5,503,484 A | * | 4/1996 | Louis | ............... 400/489 |
| 5,748,512 A | | 5/1998 | Vargas | |
| 5,764,218 A | * | 6/1998 | Della Bona et al. | ........ 345/157 |
| 5,875,311 A | | 2/1999 | Bertram et al. | |
| 6,429,847 B1 | * | 8/2002 | Johnson | ............... 345/157 |
| 6,525,717 B1 | * | 2/2003 | Tang | ............... 345/168 |
| 6,549,878 B1 | | 4/2003 | Lowry et al. | |
| 6,822,640 B1 | * | 11/2004 | Derocher | ............... 345/173 |

OTHER PUBLICATIONS

Microsoft Corp., "Microsoft Pinyin IME," 46 pages; copyright 2003.

* cited by examiner

*Primary Examiner*—Regina Liang
(74) *Attorney, Agent, or Firm*—Banner & Witcoff, Ltd.

(57) ABSTRACT

An input device is disclosed that includes a sensor for editing characters and text units. The sensor has an elongate configuration and is laterally-oriented with respect to sides of the input device. The input device also includes a plurality of keys for entering individual characters or multiple characters that form the text units. By contacting the sensor, an incorrectly-entered text unit may be selected and replaced with an intended text unit. In order to select the incorrectly-entered text unit, the sensor may be contacted in a position that corresponds with a position of the text unit with respect to a display screen.

11 Claims, 20 Drawing Sheets

CHARACTER AND TEXT UNIT INPUT CORRECTION SYSTEM

BACKGROUND OF THE INVENTION

1. Field of the Invention

The present invention relates to the correction of characters and words entered into a computing device. The invention concerns, more particularly, an input correction mechanism that is utilized to replace incorrectly-entered characters and words. The invention has application to alphanumeric, phonic, and other character-based input systems.

2. Description of Background Art

As the field of computer science has evolved, a variety of data entry techniques have been developed to enhance the individual's experience and to make computers more versatile. For example, a typical computer system, especially a computer system using graphical user interfaces for user interaction may be optimized for accepting input from one or more discrete input devices. Thus, an individual may enter text with a keyboard, and control the position of a pointer image on a display screen with a pointing device, such as a mouse, having one or more buttons for activating selections associated with the location of the pointer. Some computing systems even have included a pen-like stylus that can be used as a multipurpose data input device.

A variety of software applications have been developed that permit an individual to form data files by entering characters with a keyboard or other input device. As utilized herein, the term character is intended to encompass a symbol or other figure that may be entered by the individual. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written text, such as $, #, %, &, or @, for example. In addition, a character may be one of the various symbols utilized in Asian languages, such as the Chinese, Japanese, and Korean languages. Groups of various characters that form words or word-type units is hereby defined as a text unit.

Although conventional character entry with a keyboard is generally considered to be a convenient and expedient process, an average individual frequently enters incorrect characters and is required to modify the incorrect characters with the intended or correct characters. A common method of modifying the incorrect characters involves the use of a pointing device, for example a mouse or trackball. In order to modify the incorrect characters, the individual will cease entering characters and move one hand to the pointing device, and attempt to manipulate the pointing device to position the cursor to the incorrect character within the entire viewable X-Y field. The individual will then delete the incorrect character, replace the incorrect character with the intended or correct character, and manipulate the pointing device to move the cursor to another location which is typically the prior location of the cursor immediately before the edit. Alternately, various spell-checking programs may be utilized, for example, and some individuals may employ variations or combinations of these methods for modifying the incorrect characters. Such is normally done at the completion of the document in view of the potential disruption to the data entering process. In either event, however, the individual generally redirects attention from the keyboard to the pointing device when modifying the incorrect characters, which may decrease the efficiency of the individual, particularly when repetitively performed. Similar considerations apply to the correction of text units.

The error rate for an average individual utilizing a QWERTY keyboard for phonics-based Asian language input is approximately 20%. The error rate for an average individual utilizing a QWERTY keyboard to enter characters in the English language, for example, is generally significantly less. Accordingly, phonics-based Asian language input has a greater error rate, which further decreases the efficiency of the individual. The increased error rate for phonics-based Asian language input is directly related to the characteristics of the Asian languages. With regard to the Chinese language, for example, there are tens of thousands of characters, but only approximately 400 corresponding pronunciations, and adding four tones to the pronunciations expands the total number of pronunciations to approximately 1600. Given the relatively large number of characters utilized in the Chinese language, many different characters have similar pronunciations and are, therefore, phonetically-similar. Coupled with the expanding Chinese vocabulary, the number of similar pronunciations introduces an intrinsically-high error rate in phonics-based Chinese language input. Similar considerations apply to the Japanese and Korean languages.

Concepts related to phonics-based Asian language input and a conventional method of correcting characters in phonics-based Asian language input will now be discussed. For purposes of illustration, a Chinese language version of phonics-based Asian language input, which is generally referred to as Pinyin, will be utilized herein. One skilled in the relevant art will appreciate, however, that similar concepts may be applied to other Asian languages. In general, a QWERTY keyboard is utilized for Pinyin input to enter Roman characters and combinations of Roman characters that phonetically represent the intended Chinese character. A software application then processes the Roman characters and converts the Roman characters to a corresponding Chinese character that is similar-similar. As discussed above, many different characters have similar pronunciations and are similar-similar. Accordingly, the software application may convert the Roman characters to an incorrect or unintended Chinese character that is similar-similar to the intended Chinese character.

When an incorrect Chinese character is identified by the individual, in an existing system, the pointing device may be moved to place the cursor before and immediately adjacent to the incorrect Chinese character. A list of potential replacement Chinese characters is then displayed adjacent to the incorrect Chinese character. The individual manipulates the pointing device to select the correct Chinese character from the list. In many instances, the list may display only a portion of the total number of potential replacement Chinese characters, which may correspond with the Chinese characters that are most likely to be used on a statistical basis. Accordingly, the individual may be required to scroll through numerous lists before finding the correct Chinese character. Once the correct Chinese character is located and selected, the software application replaces the incorrect Chinese character with the correct Chinese character and the individual may continue entering characters until another incorrect Chinese character is identified. The cursor remains at the location of the corrected Chinese character and the individual will typically move the pointing device to the end of the line or document to continue entering data into the document.

Due to the relatively high error rate for phonics-based Asian language input, individuals are required to frequently identify incorrect characters and then identify the correct characters from lists of possible replacement characters, as discussed above. One skilled in the relevant art will recognize that this process may be time-consuming and inefficient given the approximate error rate of 20% for an average individual utilizing a QWERTY keyboard for phonics-based Asian language input.

SUMMARY OF THE INVENTION

One aspect of the present invention is an input device having an alphanumeric region and an editing region. The alphanumeric region has a plurality of keys for entering characters. The editing region is positioned adjacent the alphanumeric region, and the editing region has a sensor for selecting text units, such as characters or words. The sensor has an elongate configuration, and the sensor has a lateral orientation with respect to sides of the input device.

In another aspect of the invention, the input device is a keyboard having a plurality of keys and a sensor. The keys are each associated with at least one character. The sensor has a configuration of a one-dimensional linear touch position sensor, such as a capacitive position sensing touchpad, and the sensor is positioned adjacent the plurality of keys and forward of the plurality of keys. Furthermore, the sensor has a ratio of length to width that is at least 3:1, and the sensor is laterally-oriented to extend between a left side and a right side of the keyboard.

Another aspect of the invention involves a method of input correction. The method includes entering a first text unit, such as character or word, with an input device to display the first text unit on a display screen. A relative position of the first text unit with respect to the display screen is then determined. The method then involves contacting a sensor on the input device in a position that corresponds with the relative position of the first text unit with respect to the display screen, and replacing the first text unit with a second text unit.

Yet another aspect of the invention involves a method of input correction. The method includes entering a first text unit, such as character or word, with an input device, and then employing a sensor on the input device to select the first text unit, the sensor having an elongate configuration and a lateral orientation. A second character is then selected from a list of potential text unit candidates, and the first text unit is replaced with the second text unit.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose an input device in accordance with the present invention. The input device is utilized for entering characters. If an incorrect text unit, such as a character or a word, is inadvertently entered or is otherwise present, the input device can be utilized to modify the incorrect text unit with the intended or correct text unit. More specifically, a sensor coupled to the input device may be utilized by an individual to select the incorrect text unit and then replace the incorrect text unit with the correct text unit. The input device is disclosed in the following material as a keyboard. One skilled in the relevant art will recognize, however, that a plurality of other input devices having a sensor for replacing an incorrect text unit will also fall within the scope of the present invention.

As used herein, the phrase "text unit" is defined as characters and groups of characters that form words or word-type units. For example, in the English language, the term text unit refers to characters and words. Accordingly, a character-based editing system can be used to replace bits of texts on a character-by-character basis, and a word-based editing system can be used to replace text on a word-by-word basis. A text unit-based editing system would be a generic term encompassing both character-based and word-based editing systems.

Figure 1:
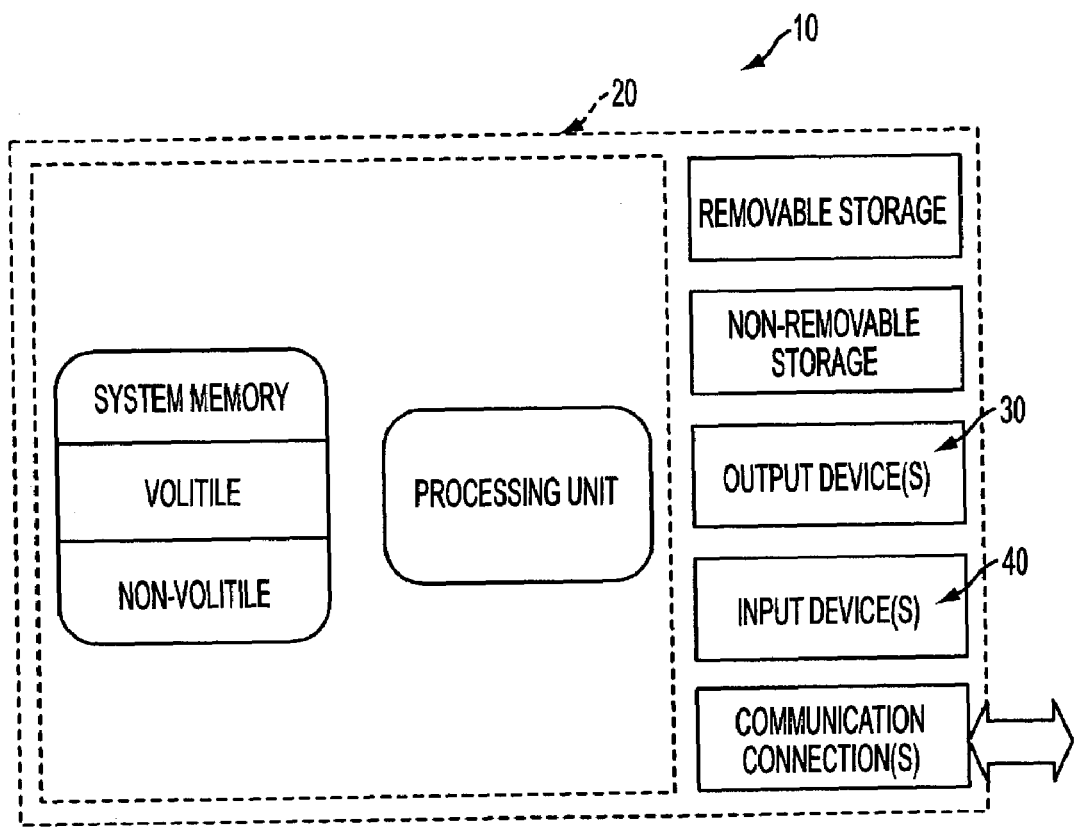
FIG. 1 is a schematic view of an operating environment.
Figure 2:
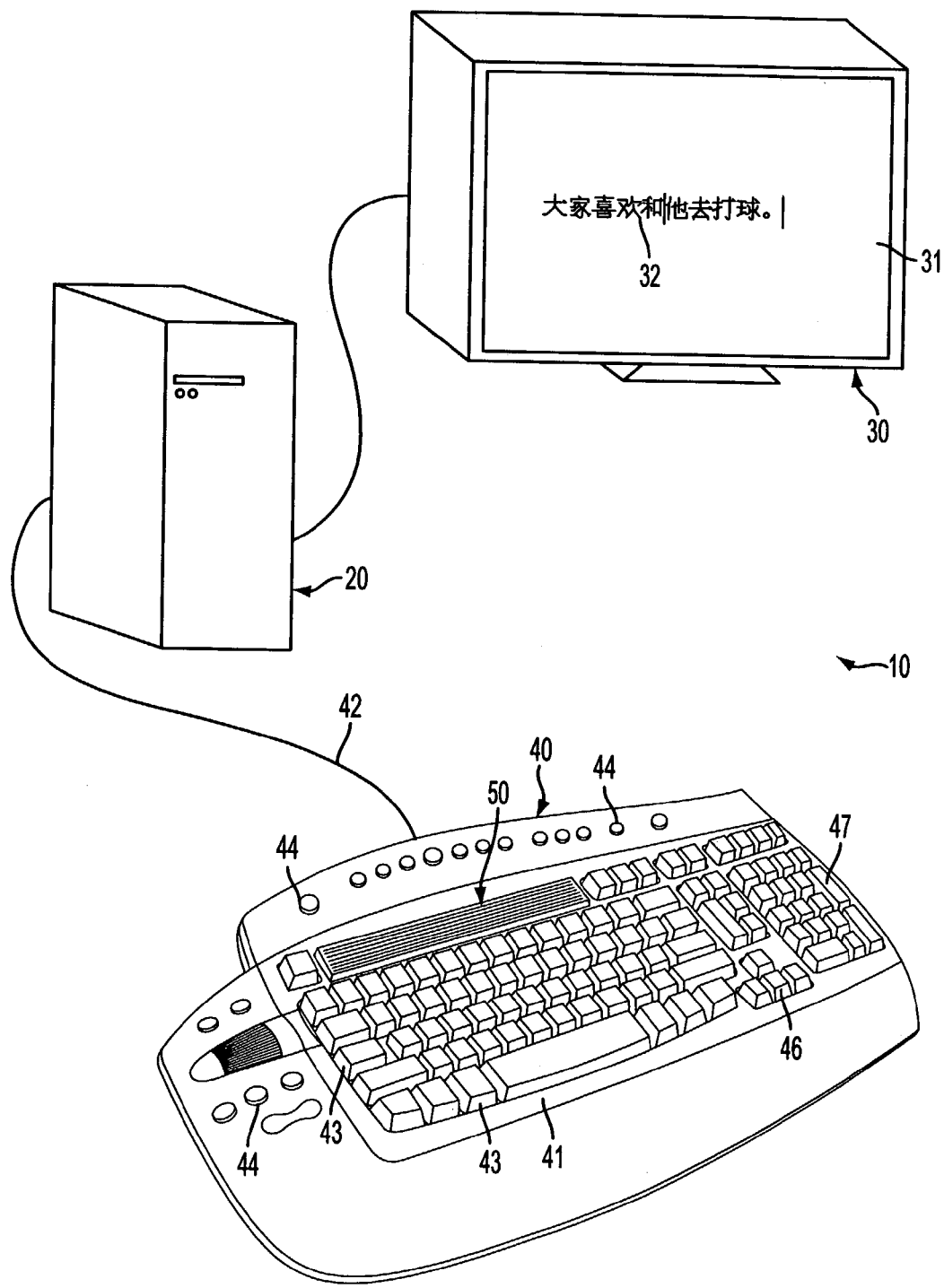
FIG. 2 is an exemplary perspective view of the operating environment, that depicts a host computer, an output device, and an input device.

As will be appreciated by those of ordinary skill in the art, the input device may be utilized in connection with a computer operating environment. That is, the signals transmitted by the input device may be governed by computer-executable instructions, such as program modules, executed by one or more computing devices. It may be helpful, therefore, to briefly discuss the components and operation of a typical operating environment on which various embodiments of the invention may be employed. FIGS. 1 and 2 illustrate examples of an operating environment 10, in which various embodiments of the invention may be implemented. The operating environment 10 is only one example of a suitable operating environment, however, and is not intended to suggest any limitation as to the scope of use or functionality of the invention. Other well known operating environments or configurations that may be suitable for use with the invention include, but are not limited to server computers, hand-held or laptop devices, multiprocessor systems, microprocessor-based systems, programmable consumer electronics, network PCs, minicomputers, mainframe computers, distributed computing environments that include any of the above systems or devices, and the like.

The operating environment 10 includes a host computer 20 that is operatively connected to an output device 30, such as a computer monitor, and an input device 40, which may be a keyboard, for example. One skilled in the relevant art will recognize that one or more data files may be processed by the host computer 20 and a signal may be transmitted to the output device 30, thereby directing the output device 30 to render an image 32 on a display screen 31. The input device 40 is utilized in connection with the host computer 20 to enter data, which may take the form of a plurality of characters, as described in greater detail below.

The host computer 20 typically includes at least some form of computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information.

In its most basic configuration, the host computer 20 typically includes a processing unit and system memory. Depending on the exact configuration and type of the host computer 20, the system memory may include volatile memory (such as RAM), non-volatile memory (such as ROM, flash memory, etc.), or some combination of the two memory types. Additionally, the host computer 20 may also have mass storage devices, such as a removable storage device, a non-removable storage device, or some combination of two storage device types. The mass storage devices can be any device that can retrieve stored information, such as magnetic or optical disks or tape, punched media, or holographic storage. As will be appreciated by those of ordinary skill in the art, the system memory and mass storage devices are examples of computer storage media.

The operating environment 10 may also have one or more additional input devices that are operatively connected to the host computer 20, such as a pointing device, microphone, or scanner, for receiving input from an individual. Furthermore the operating environment 10 may have one or more additional output devices operatively connected to the host computer 20, such as a speaker, printer, or a tactile feedback device, for outputting data to an individual. Other components of the operating environment 10 may include communication connections to other devices, computers, networks, servers, etc. using either wired or wireless media. All of these devices and connections are well know in the art and thus will not be discussed at length here.

The output device 30 is depicted as a computer monitor that is operatively connected to host computer 20. The image 32 may represent a data file, such as a text document, digital photograph, spreadsheet, or Web page, for example. The input device 40 is depicted individually in FIGS. 3 and 4 as a keyboard. As is well-known in the art, one purpose of the input device 40 is to selectively enter data, which generally takes the form of a plurality of characters and text units that may be displayed as a portion of the image 32 on the display screen 31. As described in the Background of the Invention section above, the term character is intended to encompass a symbol or other figure that may be entered by the individual. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written text, such as $, #, %, &, or @, for example. In addition, a character may be one of the various symbols utilized in Asian languages, such as the Chinese, Japanese, and Korean languages. Groups of various characters that are intended to form words or word-type units are included within the definition of a text unit.

A housing 41 forms an exterior of the input device 40, and a cord 42 extends from the housing 41 in order to transmit signals from the input device 40 to the host computer 20. Alternately, a conventional wireless connection between the input device 40 and the host computer 20 may also be utilized, as is well-known in the art. The signals that are transmitted by the cord 42 are typically generated in response to manipulation of one of a plurality of keys 43, buttons 44, or other input elements. Furthermore, the signals may be generated by a sensor 50 that has an elongate configuration and is laterally-oriented with respect to the input device 40.

The keys 43 of the input device 40 are generally arranged in a conventional manner and are positioned within an alphanumeric region 45, an arrow region 46, and a numberpad region 47, for example. The alphanumeric region 45 has the configuration of a conventional QWERTY keyboard, but may alternatively have the configuration of a AZERTY keyboard, or any other desirable keyboard configuration within the scope of the present invention. Accordingly, the alphanumeric region 45 includes a plurality of keys 43 that are associated with individual alphabetic characters, which may be alphabetic characters of the Roman alphabet, for example. A first row of the alphanumeric region 45 may also include various keys 43 that are associated with numbers as the primary characters. The keys of first row may also provide various symbols, such as !, @, #, $ and %, that are accessed in an alternative mode by depressing one a shift key simultaneously with such keys 43. In addition, the alphanumeric region 45 may include an enter key, a control key, and a space bar, for example, as is commonly known. Within the scope of the present invention, however, alphanumeric region 45 may have a plurality of configurations and may contain keys 43 with a variety of functions or purposes.

Arrow region 46 includes four keys 43*u*, 43*r*, 43*d*, and 43*l* that are respectively associated with an up arrow, a right arrow, a down arrow, and a left arrow and are commonly utilized to move the cursor 33 relative to display screen 31. Numberpad region 47 also includes a plurality of keys 43 with various numbers as the primary characters. In operation, the individual may utilize numberpad region 47 to quickly enter numeric characters due to the arrangement of the keys 43 in the numberpad region 47. The numberpad region 47 may also include a second enter key. Additionally, the buttons 44 are positioned laterally across a top portion of input device 40. Suitable uses for the buttons 44 include launching pre-designated software applications; adjusting the volume or intensity of an output device, such as a speaker; modifying power levels of host computer 20; or providing basic controls for a media player, for example. Additionally, an input region 48 may be provided and laterally-spaced from the alphanumeric region 43 to provide enhanced input capabilities and may include a scroll wheel, an application switching device, editing keys (such as cut, copy, and paste), and Internet browser control keys (such as forward and back). Details of aspects of the keyboard are disclosed in U.S. patent application Ser. No. 20020159809, published Oct. 31, 2002, which is hereby incorporated by reference for its entirety. Based upon the above discussion regarding the layout and positioning of the keys 43 and the regions 45–48, one skilled in the relevant art will recognize that the input device 40 has a generally conventional configuration, with the exception of the presence of the sensor 50 and related supporting keys as utilized in certain illustrative embodiments of the invention. Within the scope of the present invention, however, the various components of the input device 40 may have a plurality of alternate arrangements.

For reference purposes, the input device 40 has a back edge 11 distal from the individual during normal use, and a front edge 12 adjacent the individual during normal use. Accordingly, an object is said herein to be "behind" another object when it is between that object and the back edge 11. An object is said herein to be "directly behind" another object when it is between that object and the back edge 11 and at least partially located within the lateral bounds of that object extending in the front-to-back direction. An object is said herein to be "entirely directly behind" another object when it is between that object and the back edge 11 and entirely located within the lateral bounds of that object extending in the front-to-back direction. An object is said herein to be "in front of" another object when it is between that object and the front edge 12. Further, the keyboard 40 also has right and left edges 13 and 14, respectively. The direction "lateral" defines the general directions from the left edge 14 to the right edge 13 and from the right edge 13 to the left edge 14.

Figure 3:
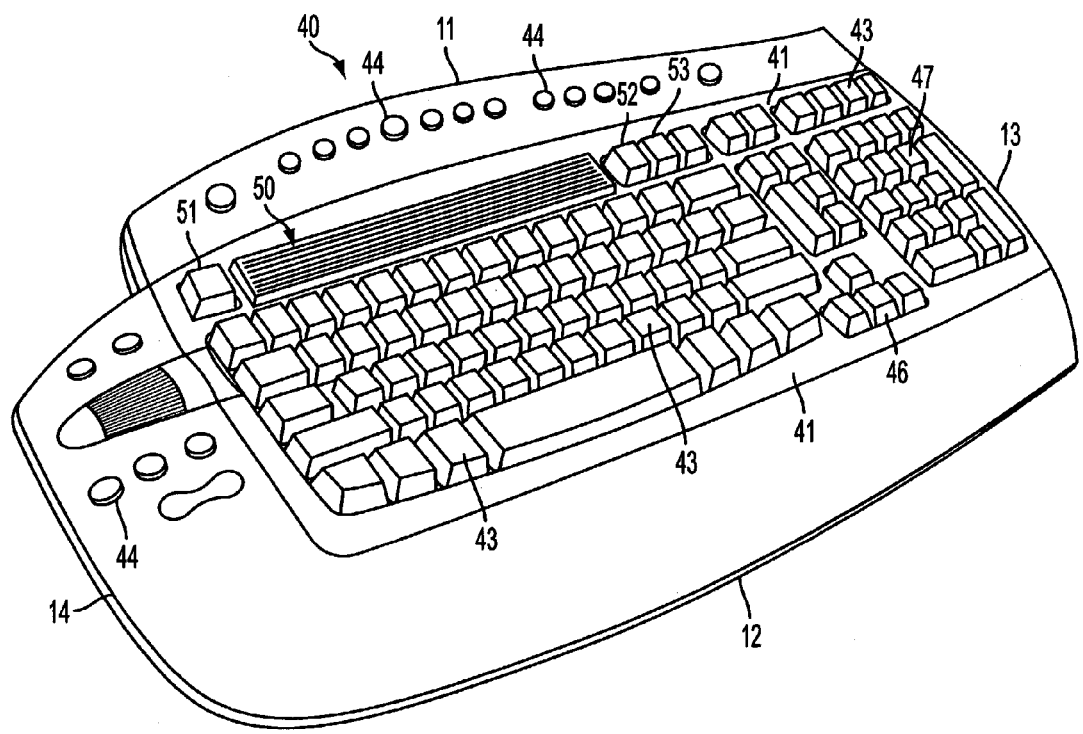
FIG. 3 is a perspective view of the input device.
Figure 4:
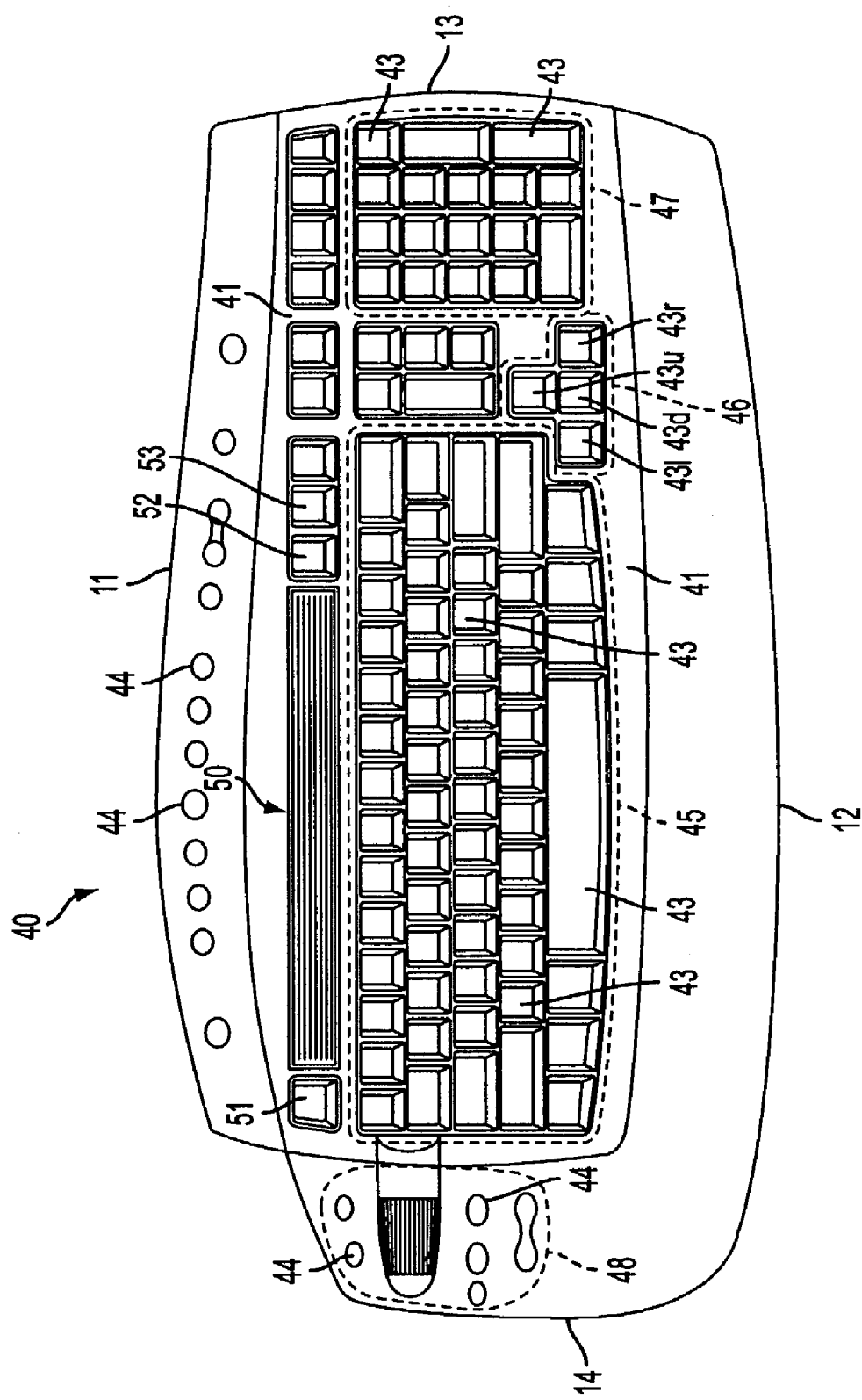
FIG. 4 is a top plan view of the input device.

In addition to the features of existing keyboards, the input device 40 also includes the sensor 50, which, in the depicted embodiment, is positioned behind and/or adjacent to, and more specifically, directly behind and entirely directly behind, the alphanumeric region 45. As depicted in FIGS. 3 and 4, the sensor 50 is adjacent to the rear portion of the, alphanumeric region 45 and extends along and adjacent to the first row of the keys 43, which are generally associated with numeric characters. Within the scope of the present invention, the sensor 50 may be positioned in other portions of the input device 40. An advantage of placing the sensor 50 adjacent to the alphanumeric region 45 relates to accessibility. The alphanumeric region 45 is a frequently utilized portion of the input device 40. Accordingly, the hands of the individual are often positioned over the alphanumeric region 45 when utilizing the input device 40. By placing the sensor 50 adjacent to the alphanumeric region 45, the sensor 50 is highly accessible to the individual and can be manipulated by an individual with finger movements during alphanumeric entry with little or no displacement of the wrist and arms.

The sensor 50 has an elongate configuration and is laterally-oriented with respect to the input device 40. In other words, the length of the sensor 50 is greater than the width of the sensor 50, and the sensor 50 extends generally from a right side of the input device 40 to a left side of the input device 40. A ratio of the length to the width of the sensor 50 may be at least 3:1, but may also be 4:1 or 10:1 or greater, for example. In general, therefore, the ratio of the length to the width of the sensor 50 is in a range of 3:1 to 10:1, but may be more depending upon the specific application. Accordingly, the length of the sensor 50 may be significantly greater than the width of the sensor 50.

Figure 10:
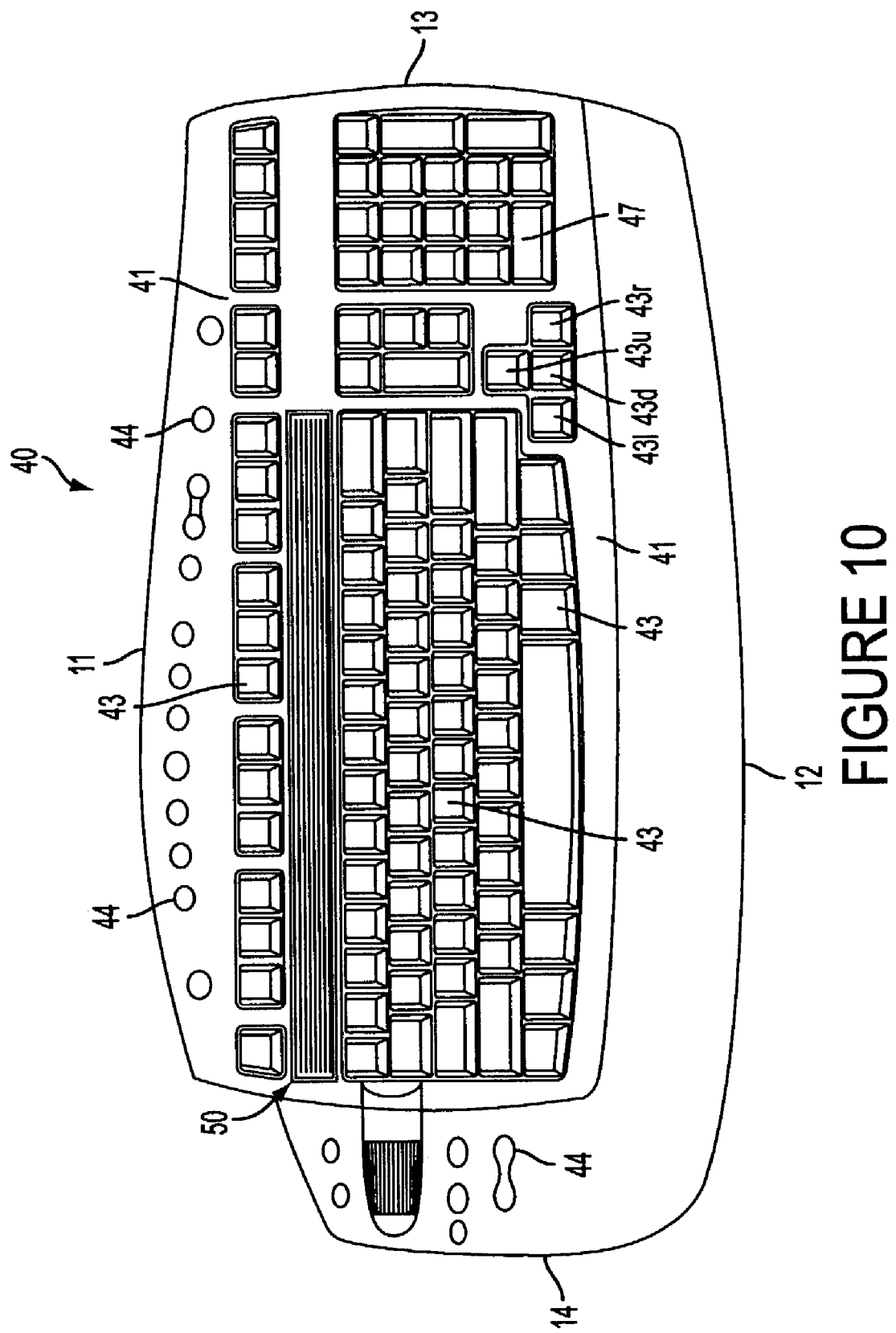
FIG. 10 is a top plan view of another input device.

Many conventional keyboards include a plurality of function keys that are designated by F1, F2, F3, etc. The sensor 50 may be located in the position that is conventionally reserved for the function keys, and actions associated with the function keys may be assigned to other ones of the keys 43, if desired. In applications where the function keys are to be preserved the sensor 50 may be positioned between the alphanumeric region 45 and the row of function keys such as shown in FIG. 10.

The sensor 50 may be a one-dimensional linear touch position sensor, such as a capacitive position sensing touchpad or other touch sensitive strip. Touch-sensitive strips, pads and, other such devices are well-known, such as the touch pad for cursor control commonly found on many laptop computers. The present sensor 50 may take advantage of such known technology and/or be physically configured in any way to create a touch-sensitive device. The sensor 50 may be sensitive to human touch and/or to non-human touch such as from a pen or stylus-type pointer. The sensor 50 also may be utilized without actually touching the surface of the sensor 50 with the pointer. For instance, the sensor 50 may be configured to detect the pointer position as it hovers just over the surface of the sensor 50, as is known in the art.

The sensor 50 is coupled to the input device 40, and one or more interfaces and/or driving circuitry/software may be utilized to provide communication between the sensor 50 and the host computer 20. Some or all of the interfaces and drivers, if any, may be located wherever is convenient, such as all within the input device 40 all within the host computer 20, or distributed between the two.

The sensor 50 may detect the position of a pointer along the sensor 50 in any of a variety of ways. For example, the sensor 50 may be a well-known capacitance-type sensor that senses changes in capacitance between two or more conductive nodes within the sensor 50. The conductive nodes do not electrically touch but generate a capacitance in the dielectric junction between the nodes. When a pointer, such as a human finger or stylus, approaches the junction, the capacitance may be altered due to the change in dielectric constant imposed by the pointer. Such a touch sensor 50 has the advantages of being able to sense not only touch but also proximity and pressure. The conductive nodes may be of any shape and size, such as wires and/or plates. Depending upon the specific embodiment, such a capacitive touch strip may detect pointer location with an accuracy of up to 0.001 inch or more. However, touch sensors with less precision can be effectively used.

The sensor 50 may alternatively be a resistance-type touch strip that detects variations in resistance based on the position of the pointer along the touch strip. Or, the sensor 50 may be an inductance-type touch strip that detects variations in inductance based on the position of the pointer along the touch strip. The sensor 50 may further incorporate infrared-sensing, laser, and/or ultrasonic technology that senses the position of the pointer.

Based upon the above discussion, the input device 40 may have the general configuration of a conventional keyboard.

In contrast with a conventional keyboard, however, the input device 40 includes the sensor 50, which is positioned adjacent to the alphanumeric region 45. Within the scope of the present invention, the input device 40 may take the form of a plurality of other types of input devices, in addition to a keyboard. For example, the keypads of a conventional wireless telephone are often utilized to input characters and form text units, and a sensor having the form of the sensor 50 may be utilized in conjunction with the keypad. Furthermore, an input device having the configuration of a pointing device, such as a mouse or trackball, may also be utilized in some situations to input characters, and a sensor having the form of the sensor 50 may be utilized in conjunction with the pointing device. Accordingly, the input device 40 may have the general configuration of a variety of input devices. For purposes of the following discussion, however, the input device 40 will be discussed with regard to a keyboard, as depicted in FIGS. 3–4.

The text unit system of the present invention includes the text unit editing sensor 50 and supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode. These supporting input elements can take various types of input elements and may include keys presently used on the keyboard of other uses, such as the arrow keys 43$u$, 43$d$, 43$r$, and/or 43$l$, and/or may include new or specifically dedicated input elements such as keys 51, 52, and 53 as shown in FIGS. 3–5, key 51 and toggle 55 as shown in FIG. 11, or toggle 56 as shown in FIG. 12, as is hereinafter described.

Figure 5:
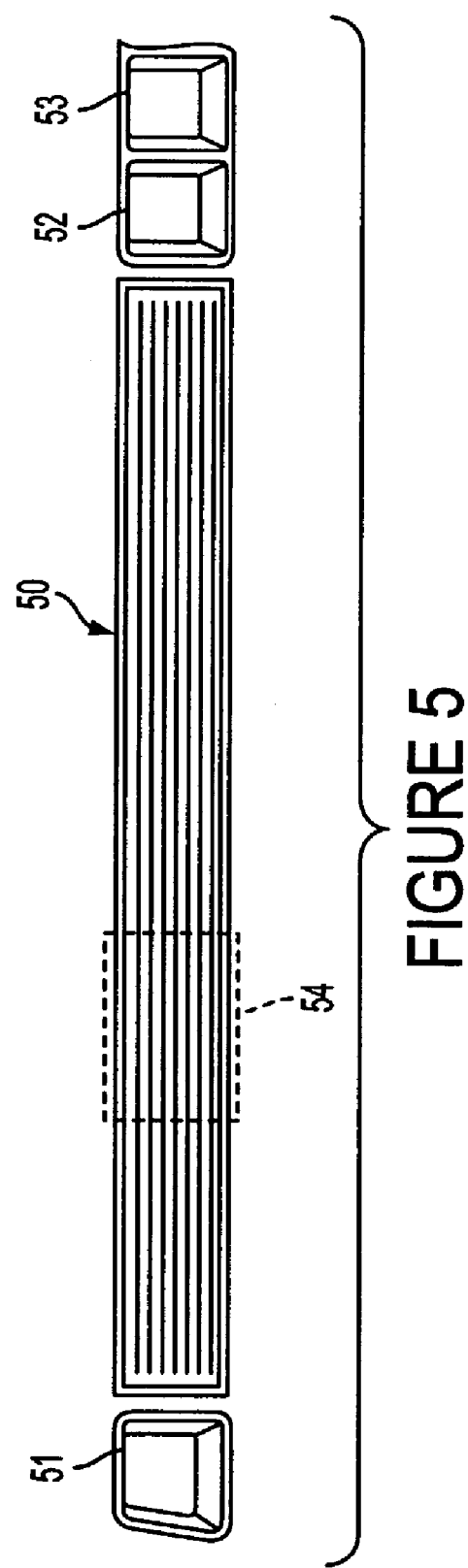
FIG. 5 is a top plan view of a portion of the input device.

With reference to FIG. 5, a portion of the input device 40 that includes the sensor 50 is depicted. A key 51 is positioned to the left of the sensor 50 and immediately adjacent to the sensor 50. Similarly, a key 52 is positioned to the right of the sensor 50 and immediately adjacent to the sensor 50, and a key 53 is positioned to the right of the key 52. For the embodiment of FIGS. 3–5, keys 51, 52, and 53 and the arrow keys 43$l$, 43$r$, 43$u$, and 43$d$ are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

In the configuration of FIG. 10, wherein the sensor 50 is positioned between the alphanumeric region 45 and the function keys, the arrow keys 43$l$, 43$r$, 43$u$, and 43$d$ are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

Figure 11:
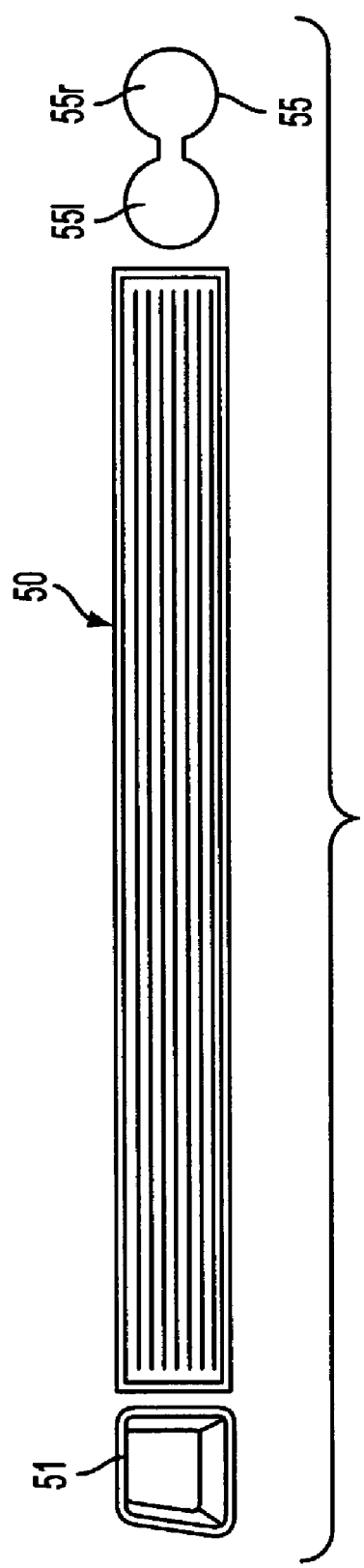
FIG. 11 is a top plan view of a portion of yet another input device.
Figure 12:
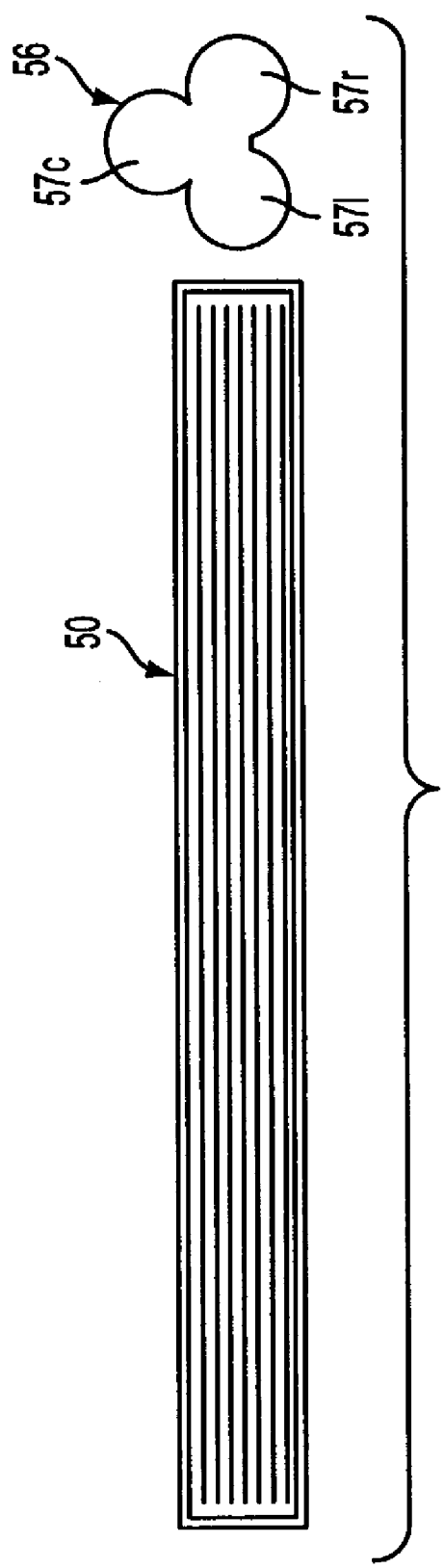
FIG. 12 is a top plan view of a portion of a further input device.

A third configuration is depicted in FIG. 11 and includes the sensor 50, the key 51, and a toggle key 55. The toggle key 55 is associated with two switches. When a right portion 55$r$ of the toggle key 55 is depressed, a first of the switches is closed. Similarly, when a left portion 55$l$ of the toggle key 55 is depressed, a second of the switches is closed. Accordingly, the individual may depress either the right or left side of the toggle key 55 to effect an action. In this configuration, the sensor 50 may be utilized as discussed above. In this arrangement, the toggle key 55 and key 51 are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

A fourth configuration of the editing region of the input device 40 is depicted in FIG. 12 and includes the sensor 50 and a three-way toggle key 56. The toggle key 56 includes three regions 57$a$, 57$b$, and 57$c$, and the individual may depress one of the regions 57$a$–57$c$ at a single time. The sensor 50 may be utilized in conjunction with a plurality of supporting input elements, such as keys 51–53, toggle key 55, or toggle key 56. Thus, the regions 57$a$, 57$b$, and 57$c$ of toggle key 56 are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

The manner in which the input device 40 is utilized to modify characters will now be discussed. With reference to FIGS. 6–9, an example of a graphical user interface that may be displayed on the display screen 31 as at least a portion of the image 32 is depicted. For purposes of example, the graphical user interface is depicted as a word processing software application that is displayed within a window 33 having a border 34$a$, a taskbar 34$b$, a toolbar 34$c$, and a character processing area 34$d$. Such is conventional during the use of word processing programs such as Microsoft WORD. The border 34$a$ defines the boundaries of the window 33 and may be adjustable in size to suit the preferences of the individual. The taskbar 34$b$ is horizontally-oriented and positioned adjacent to an upper portion of the border 34$a$ to provide a plurality of menus that permit the individual to perform various tasks related to the specific data file represented within the window 33. Furthermore, the toolbar 34$c$ is positioned directly below the taskbar 33$b$ and provides a series of buttons that also permit the individual to perform various tasks related to the specific data file represented within the window 33.

Figure 6:
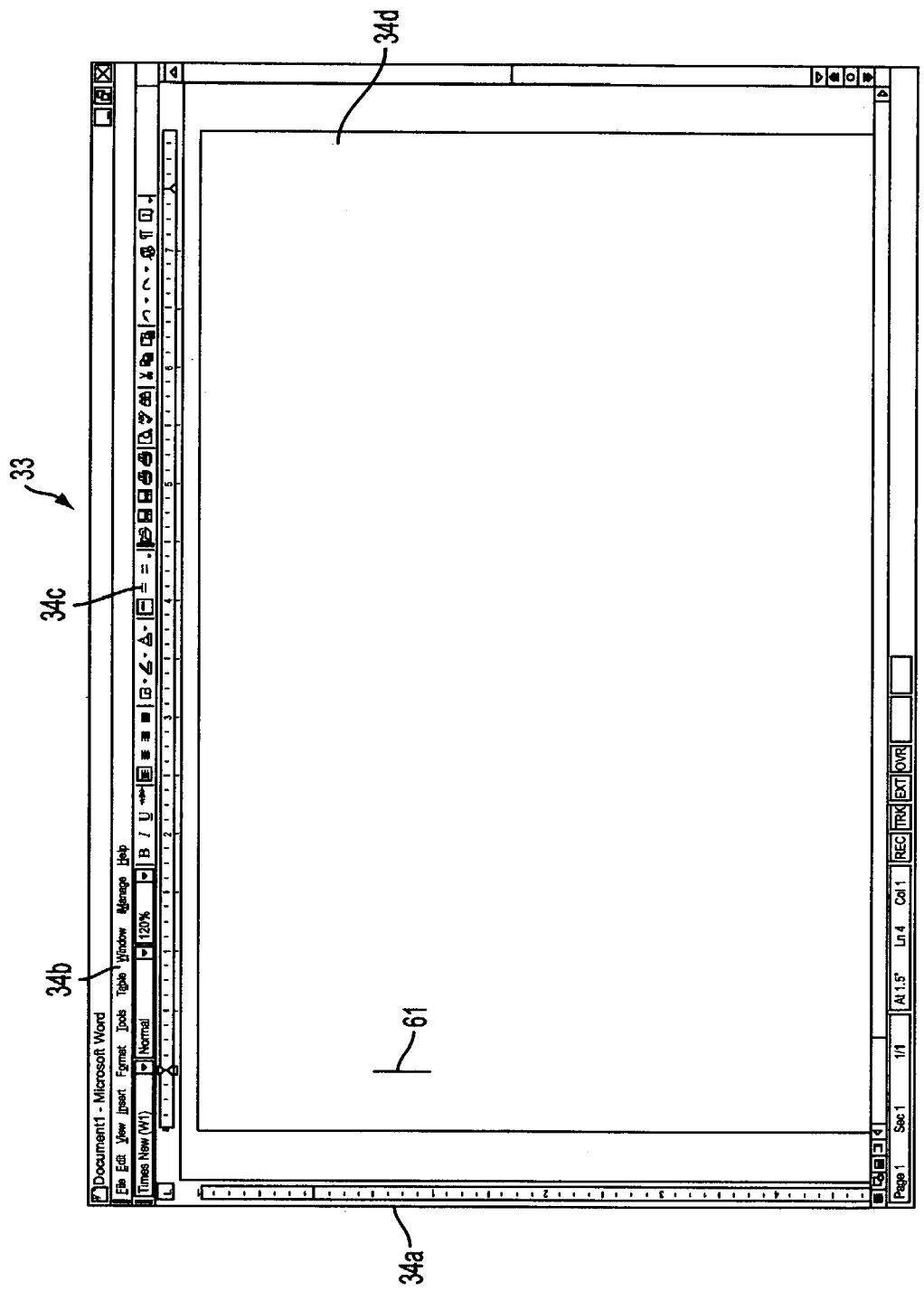
FIG. 6 is a first configuration of a first graphical user interface that may be displayed on the output device.
Figure 7:
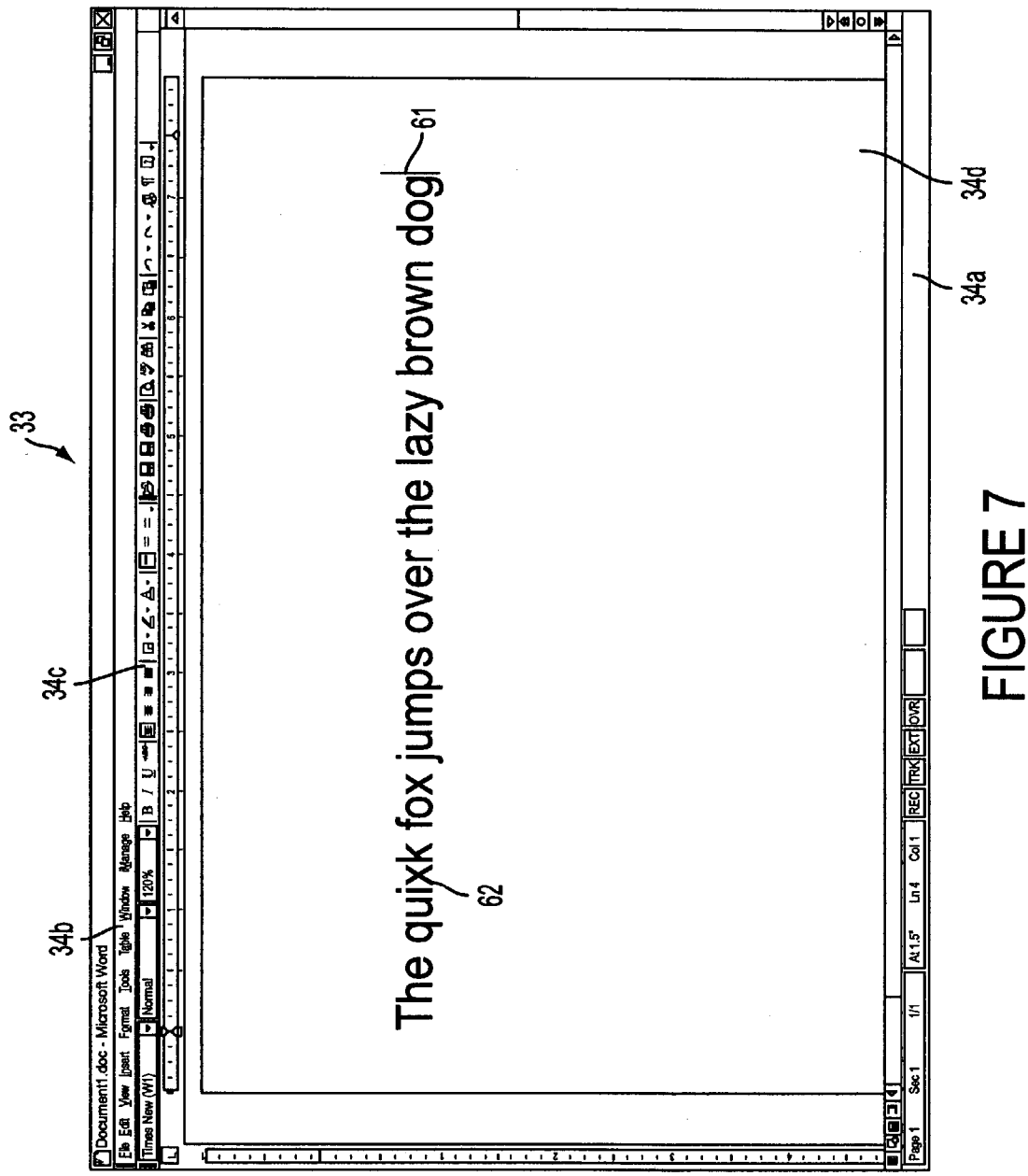
FIG. 7 is a second configuration of the first graphical user interface.

The character processing area 34$d$ provides a space for the individual to enter various characters. More particularly, the character processing area 34$d$ is a defined area where input from input device 40 is visually rendered. When the window 33 is initially rendered on display screen 31, the character processing area 34$d$ may be substantially blank, with the exception of a cursor 61, as depicted in FIG. 6, which shows the individual the position where characters and text units will appear when the characters are input with the input device 40. The width of the character processing area 34$d$ is herein defined as the distance on the display covering the typeable area, e.g., from left margin to right margin. Assume for purposes of example that the individual wishes to input the following series of text units: The quick fox jumps over the lazy brown dog. In order to accomplish this task, the individual merely depresses a series of the letter keys 43 that correspond with the characters in the sentence, as is well-known in the art. On occasion however, the individual may inadvertently enter incorrect characters. Accordingly, the individual may inadvertently type the following series of characters: The quixk fox jumps over the lazy brown dog, as depicted in FIG. 7, wherein "quick" is inadvertently entered as "quixk".

The sensor 50 may be utilized by the individual to correct the inadvertently-entered text unit. More specifically, the individual may utilize the sensor 50 to modify a text unit 62 within the character processing area 34$d$. When entering the series of characters, the individual intended to enter characters that form the word "quick", but inadvertently-entered the text unit 62, which includes an "x" instead of a "c".

Conventional word processing software applications, such as Microsoft WORD, provide a plurality of methods by which the individual may modify the text unit 62 to the intended text unit. As is known in the art, the user may utilize a pointing device to move the cursor 61 adjacent to the text unit 62, highlight a portion of the text unit 62 with the pointing device, and then depress the key 43 that corresponds with the intended character. Alternately, an arrow key may be utilized to move the cursor 61 to the text unit 62, and then a portion of the text unit 62 may be deleted and replaced with the intended character. Furthermore, a spell checking program may be utilized to modify the text unit 62. One limitation upon the spell checking program, however, is that inadvertently-entered characters that form a recognized text unit may not generally be recognized and modified with a spell checking program.

As an alternative to the conventional methods by which the individual may replace the text unit 62 by using the text unit replacement system of the present invention. The text unit system of the present invention includes the text unit editing sensor 50 and supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode. These supporting input elements can take various types of input elements and may include keys presently used on the keyboard of other uses, such as arrow keys 43*u*, 43*d*, 43*r*, and/or 43*l*, and/or may include new or specifically dedicated input elements such as keys 51, 52, and 53 as shown in FIGS. 3–5, key 51 and toggle 55 as shown in FIG. 11, or toggle 56 as shown in FIG. 12.

Specifically, to utilize the text unit replacement system, a text unit, e.g., a word or character, to be replaced is selected. This is performed by making contact with the sensor 50. By contacting the sensor 50, the normal data entry and editing routine within the word processing program is interrupted, and the text unit replacement mode is entered.

The location contacted on the sensor 50 relative to the side-to-side length of the sensor 50 will correspond to the location of the text unit that is intended to be replaced. More specifically, the user will attempt to contact sensor 50 at a position corresponding to the location of the text unit to be corrected relative to the width of the line of text. For example, the text unit "quixk" in FIG. 7 is approximately one-quarter of the distance from a left side of the character processing area 34*d* to a right side of the character processing area 34*d*. Accordingly, to select the word "quixk" to be replaced, the user may contact an area on the sensor 50 that is approximately one-quarter of the distance from the left side of the sensor 50 to the right side of the sensor 50, which corresponds with a zone 54 that is depicted in FIG. 5. Alternatively, the sensor 50 is mapped to correspond to the location of the text unit to be corrected relative to the width of the specific line of text, i.e., from the beginning of the line to the end of the line.

Figure 8:
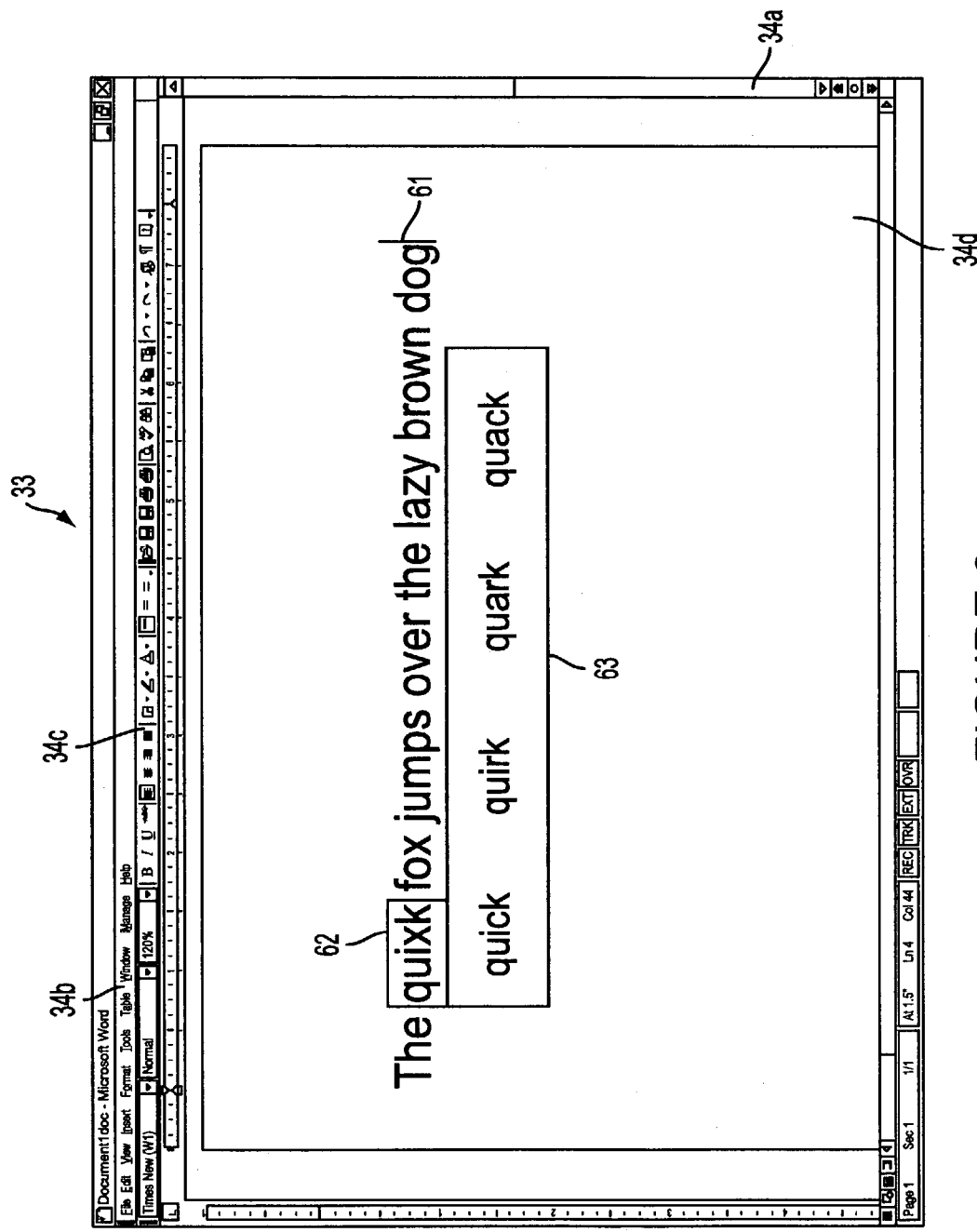
FIG. 8 is a third configuration of the first graphical user interface.

Upon contacting the sensor 50, the initially selected text unit may be graphically accentuated by highlighting or otherwise graphically differentiating the selected text unit from the other text units on the line. The action of making contact with the zone 54 will highlight one or more text units that are approximately one-quarter of the distance from a left side of the character processing area 34*d* to a right side of the character processing area 34*d*, as depicted in FIG. 8.

If the initially selected text unit to be replaced is not the desired text unit to be replaced, the user can modify the selection. In an exemplary embodiment, such is performed by the user moving the pointer, e.g., the user's finger, to the left or the right on the sensor, and alternative text unit can be designated to be replaced corresponding to the final contact location on sensor 50. The line containing the text unit to be selected for replacement is designated for default to be the line where the cursor 61 is located. If desired, keys, not shown, may be provided for input to move the line of text to be replaced up or down.

Accordingly, a proportional system is utilized to determine the specific text unit that is selected. As discussed above, the text unit 62 was approximately one-quarter of the distance from a left side of the character processing area 34*d* to a right side of the character processing area 34*d*, and the individual contacted an area on the sensor 50 that is approximately one-quarter of the distance from a left side of the sensor 50 to a right side of the sensor 50, which corresponds with a zone 54. Accordingly, the specific text unit that is selected through contact with the sensor 50 may be selected based upon a proportionality between the position of the text unit and the position of contact with the sensor 50. The software application that controls the use of the sensor 50 may also be configured to only select a single text unit, i.e., either a single character or a single word. Accordingly, making contact with the sensor 50 may be utilized to select a single character located on the line of the cursor 61.

Confirmation of the text unit to be replaced is then performed. In a first embodiment, such confirmation is performed by the actuation of an input element separate from sensor 50. For example, such confirmation can be performed by pressing up arrow or down arrow 43*u* or 43*l* (FIG. 4 and/or 10), or by pressing key 51 (FIG. 5 and/or 10), or by pressing the upper directional portion 57*c* of toggle 56 (FIG. 12). In alternative embodiments, confirmation may be performed by actuation of the sensor 50 in a predetermined manner such as maintaining contact on the desired location of the sensor 50 for a predetermined period of time or by a subsequent "tap" of the sensor 50 at the same location. Algorithms for controlling the interface regarding sensor 50 to determine when a touch is proper or inadvertent, when a predetermined contact has been met, or when a subsequent tap or double tap has occurred are known in the art and any suitable algorithm may be used.

Upon confirmation of a text unit to be replaced, alternative choices of replacement text unit candidates for selection are graphically presented. Preferably, and as shown in FIG. 8, the potential text unit candidates for selection are presented in a horizontally orientation facilitating the use of the sensor 50 for selection of a replacement text unit. For example, as shown in FIG. 8, a list 63 that includes potential replacement text units, such as "quick", "quirk", "quark", and "quack" is presented in a horizontal orientation immediately below the line of text containing the text unit to be replaced. The replacement candidates can be provided based on a spelling mode wherein alternative word options can be presented based on words having a similar spelling to the word to be replaced, and any desired spelling replacement technique can be used. Alternatively and/or in addition, the replacement candidates can be provided based on a thesaurus mode wherein alternative word options can be presented based on words having a similar meaning to the word to be replaced, and any desired thesaurus replacement technique can be used.

In the event that the user is not satisfied with the replacement candidates offered in the current horizontally oriented graphical display region, he or she may modify the list of candidate replacement text units with the input of additional keys. By pressing a predetermined input element, such as arrow keys 43*l* and 43*r* (FIG. 4), keys 52 and 53 (FIGS. 3–5), left and right regions 55*l* and 55*r* of toggle 55 (FIG. 11), or left and right regions 57*l* and 57*r* of toggle 57 (FIG. 12) and new set of replacement candidate text units is presented. Contacting the left and right keys/regions of these elements will toggle multiple sets of replacement candidate text units until the user locates a desired text unit replacement candidate.

To select the desired text unit for replacement, the user identifies the desired text unit for replacement (i.e., "quick") from the list 63 of potential replacement text units (i.e., "quick", "quirk", "quark", and "quack"). The location contacted on the sensor 50 relative to the side-to-side length of the sensor 50 will correspond to the location of the replacement text unit candidate that is intended to be used to replace the previously selected text unit. More specifically, the user will attempt to contact sensor 50 at a position corresponding to the location of the text unit to be corrected relative to the width of the graphical display of potential text unit replacement candidates. For example, the candidate text unit "quick" in FIG. 8 covers approximately the first quarter of the distance from a left side of the candidate text unit replacement graphic to the right side of the candidate text unit replacement graphic. Accordingly, to select the word "quick" to replace "quixk", the user may contact an area on the sensor 50 that is within the zone spanning approximately 0% to 25% of the distance from the left side of the sensor 50 to the right side of the sensor 50. Upon contacting the sensor 50 in this region, the initially selected replacement text unit candidate may be graphically accentuated by highlighting or otherwise graphically differentiating the selected text unit candidate from the other displayed text unit candidates within the set.

If the initially selected text unit candidate to be replaced is not the desired replacement text unit candidate, the user can modify the selection. In an exemplary embodiment, such is performed by the user moving the pointer, e.g., the user's finger, to the left or the right on the sensor, and an alternative replacement text unit candidate (e.g., "quirk") can be designated corresponding to the final contact location on sensor 50.

Figure 9:
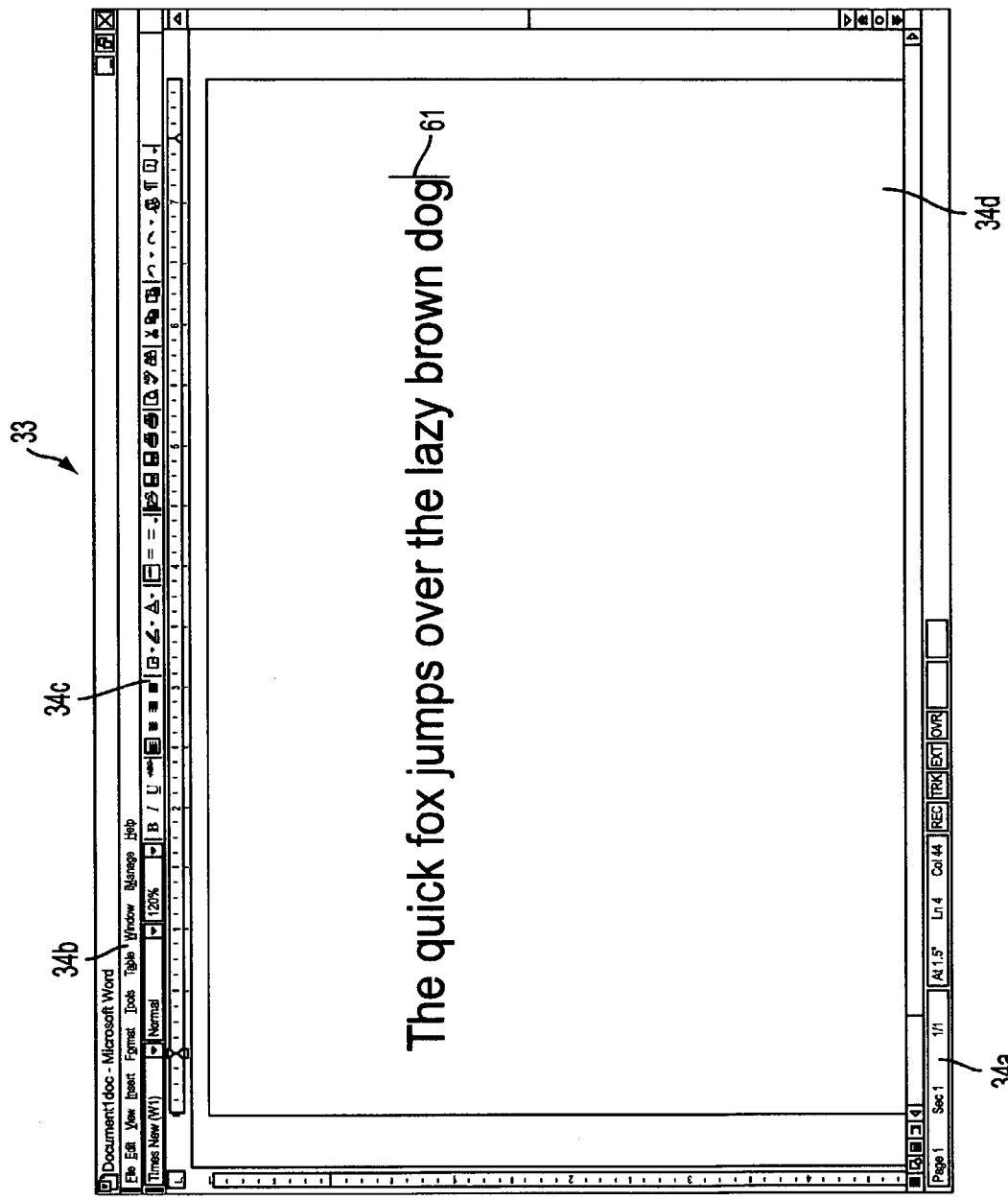
FIG. 9 is a fourth configuration of the first graphical user interface.

Confirmation of the replacement text unit candidate to be used is then performed. In a first embodiment, such confirmation is performed by the actuation of an input element separate from sensor 50. For example, such confirmation can be performed by pressing up arrow or down arrow 43*u* or 43*l* (FIG. 4 and/or 10), or by pressing key 51 (FIG. 5 and/or 10), or by pressing the upper directional portion 57*c* of toggle 56 (FIG. 12). In alternative embodiments, confirmation may be performed by actuation of the sensor 50 in a predetermined manner such as maintaining contact on the desired location of the sensor 50 for a predetermined period of time or by a subsequent "tap" of the sensor 50 at the same location. Upon confirmation of the desired replacement text unit to be used, the selected text unit to be replaced (e.g., "quixk", is replaced with the selected replacement text unit candidate (e.g., "quick") both at the data level and graphically, and the result of such is shown in FIG. 9. Upon such confirmation, the text unit replacement mode is exited and the user is then returned to the typical data entry and editing mode as is normally used in the word processing program. Upon this return, the cursor 61 is located at its previous location (e.g., at the end of the string of characters). In this location, the individual may merely continue entering characters when the editing process is complete. An advantage of this feature is that the editing process requires a relatively small degree of distraction when compared with conventional editing processes.

Additionally, one of the supporting keys or an alternative key such as an escape (ESC) key may be used to exit the text unit replacement mode and return to the typical data entry and editing mode prior to the replacement of the text unit if desired.

Based upon the above discussion, the sensor 50 may be utilized to conveniently modify incorrectly-entered characters or text units. The alphanumeric region 45 is generally the most frequently utilized portion of the input device 40, and the hands of the individual are often positioned over the alphanumeric region 45 when utilizing the input device 40. By placing the sensor 50 adjacent to the alphanumeric region 45, the sensor 50 is highly accessible to the individual. Accordingly, the individual may utilize the sensor 50 without having to significantly adjust hand position with respect to the input device 40. For example, at least one hand is generally moved away from the input device 40 to utilize a pointing device to select and modify the text unit 62. Moving a hand away from the input device 40 generally requires that the concentration of the individual change from the input device 40 to the pointing device, thereby interrupting thought processes that are centered around the input device 40. The sensor 50, however, is incorporated into the input device 40 and the use of sensor 50 may be accomplished with less disruption. Furthermore, the use of sensor 50 may be a more expedient manner of modifying the text unit 62 than methods involving the pointing device.

Input device 40 and the sensor 50 may also have application in the context of phonics-based Asian language input. Additionally, the text unit editing system may be used to replace characters as an alternative to replacing words. Referring to FIGS. 13–18, an example of another graphical user interface that may be displayed on the display screen 31 as at least a portion of the image 32 is depicted. For purposes of example, the graphical user interface is depicted as a software application for phonics-based Asian language input. More particularly, the graphical user interface is depicted as a software application for phonics-based Chinese language input that is displayed within a window 33' having a border 34*a*', a taskbar 34*b*', a toolbar 34*c*', and a character processing area 34*d*'. The border 34*a*' defines the boundaries of the window 33' and may be adjustable in size to suit the preferences of the individual. The taskbar 34*b*' is horizontally-oriented and positioned adjacent to an upper portion of the border 34*a*' to provide a plurality of menus that permit the individual to perform various tasks related to the specific data file represented within the window 33'. Furthermore, the toolbar 34*c*' is positioned directly below the taskbar 34*b*' and provides a series of buttons that also permit the individual to perform various tasks related to the specific data file represented within the window 34'.

Figure 13:
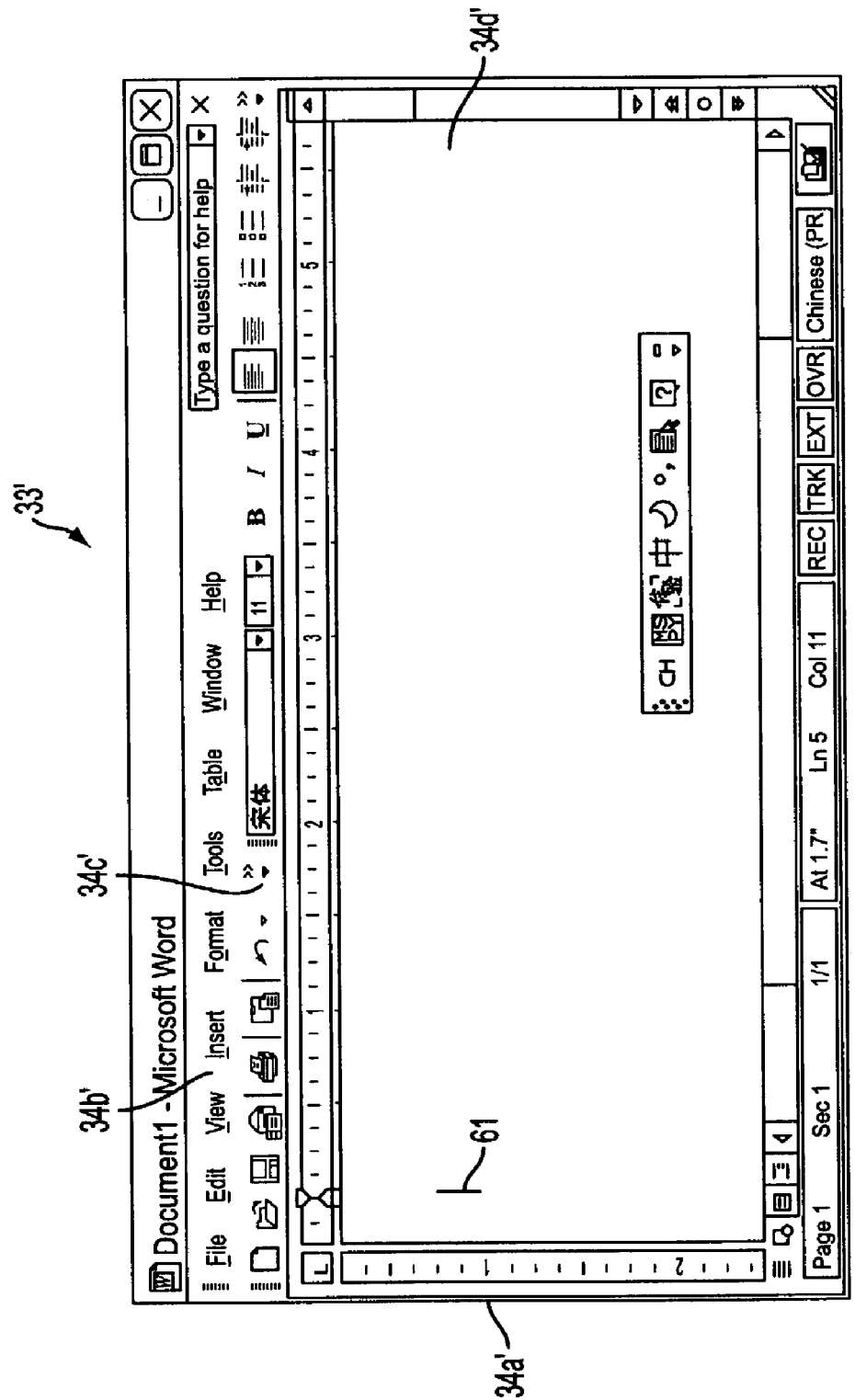
FIG. 13 is a first configuration of a second graphical user interface that may be displayed on the output device.

The character processing area 34*d*' provides a space for the individual to enter various characters. More particularly, the character processing area 34*d*' is a defined area where input from input device 40 is visually rendered. When the window 33' is initially rendered on display screen 31, the character processing area 34*d*' may be substantially blank, with the exception of the cursor 61, as depicted in FIG. 13, which shows the individual the position where characters will appear when the characters are input with the input device 40.

Figure 14:
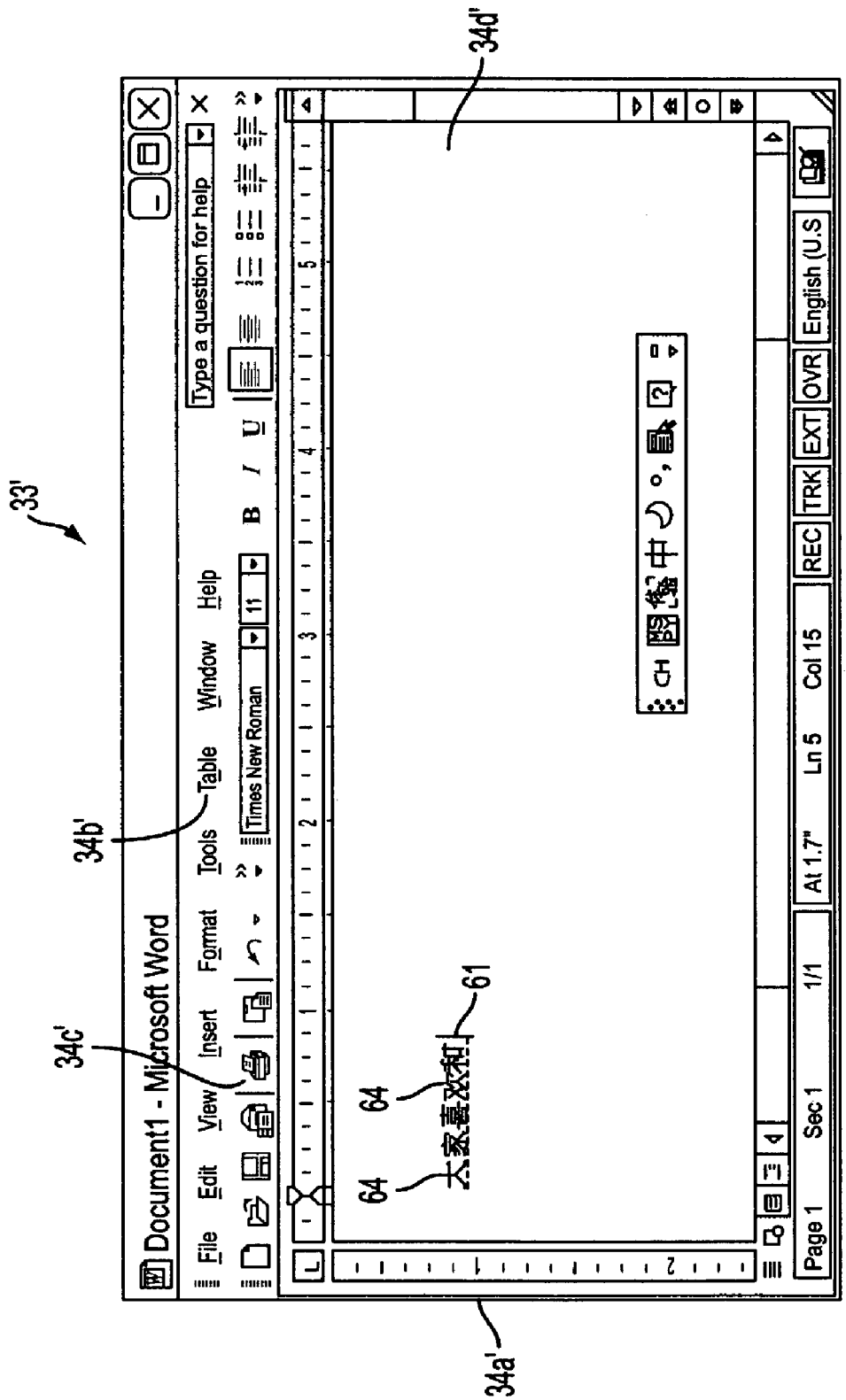
FIG. 14 is a second configuration of the second graphical user interface.
Figure 15:
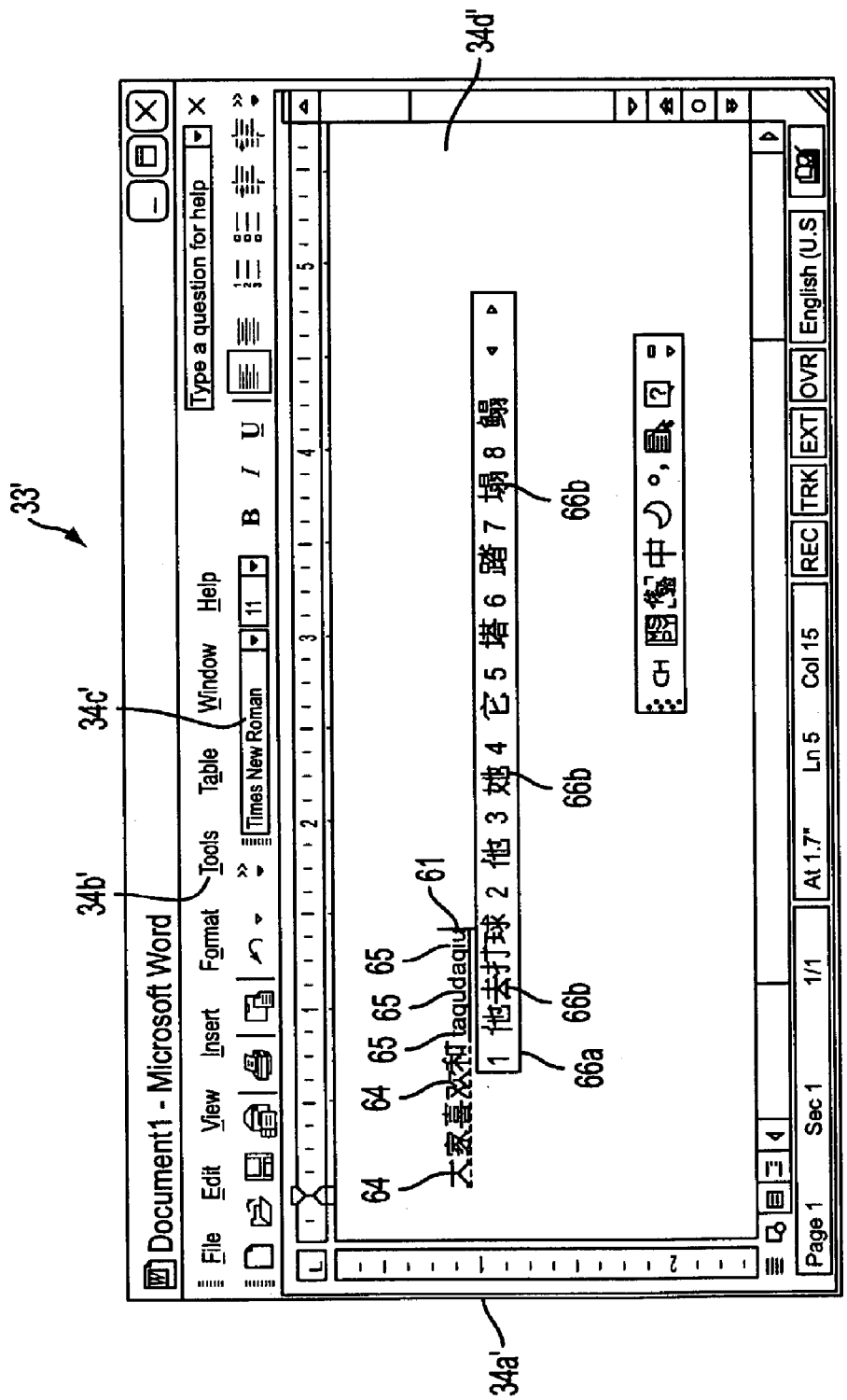
FIG. 15 is a third configuration of the second graphical user interface.
Figure 16:
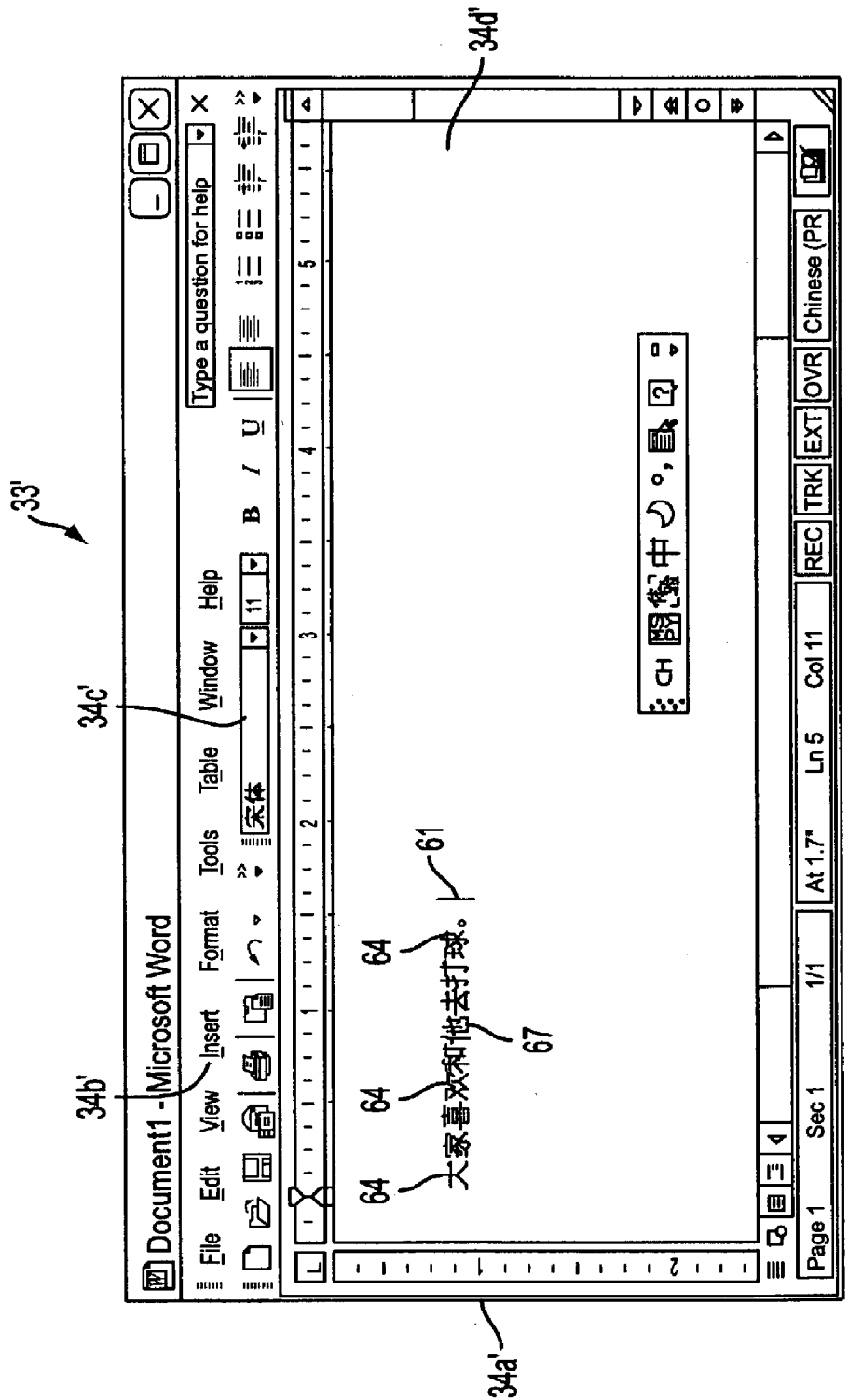
FIG. 16 is a fourth configuration of the second graphical user interface.
Figure 17:
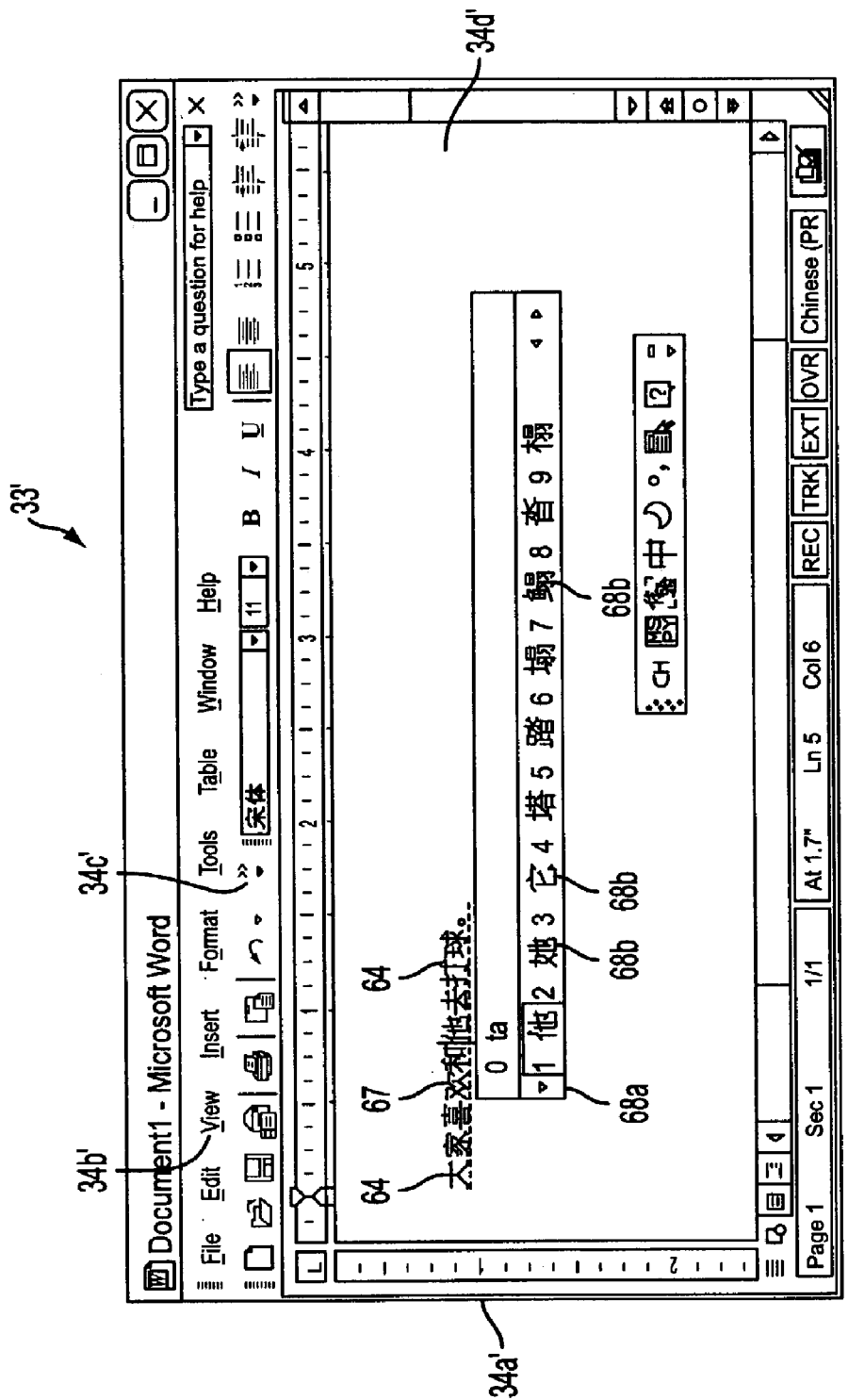
FIG. 17 is a fifth configuration of the second graphical user interface.

In order to enter Chinese characters with phonics-based Asian language input, the individual enters Roman characters and combinations of Roman characters that phonetically represent the intended Chinese character. Accordingly, Roman characters and combinations of Roman characters are entered and are converted to form Chinese characters. More specifically, the software application then processes the Roman characters and converts the Roman characters to a corresponding Chinese character that is phonetically-similar. Accordingly, the individual may enter various Roman characters to display Chinese characters 64, as depicted in FIG. 14. In order to display additional Chinese characters, the individual enters phonetically-similar Roman characters 65, as depicted in FIG. 15. As Roman characters 65 are entered, the software application provides a list 66*a* having a plurality of potential Chinese characters 66*b* that may be selected to replace the Roman characters 65. If the individual does not affirmatively select one of potential Chinese characters 66*b*, the most probable candidate is automatically selected by the software application, as depicted in FIG. 16. Accordingly, the software application displays additional Chinese characters 64 following entry of the Roman characters 65.

Upon inspection of the Chinese characters 64, the individual may determine that an incorrect or undesired Chinese character 67, as depicted in FIG. 16, was utilized. The user may then contact the sensor 50 to enter the text unit replacement mode as described above. As the contacted location of the sensor 50 corresponds to the location of the intended character to be replaced on its line of text, the user will attempt to contact the sensor 50 appropriately. For example, if the character to be replaced is half way form the beginning of the line to the end of the line of text, the user will want to contact the sensor in the center (i.e., midway from the left of the sensor 50 to the right of the sensor). The position on the sensor 50 will designate the character that the user will want to replace and such will be graphically accentuated. If the character initially selected for replacement is not the intended character to be replaced, the user can modify his or her selection as described above, e.g., by moving the pointer along the sensor 50 to the proper location. Once the desired character to be selected has been made, the user can confirm the selection as described above, i.e., by using specific keys 43*l*, 51, or 57*c*, or by contacting the sensor again in the same location.

Once the character to be replaced has been confirmed, a list 68*a* of potential replacement Chinese characters 64 is graphically provided horizontally and below the line of the selected character 67 to be replaced. The list 68*a* includes a set of candidate Chinese characters 68*b* for replacement. The depicted list 68*a* includes nine alternate Chinese characters 68*b*. In many circumstances, the total number of alternate Chinese characters 68*b* may significantly exceed nine. In order to display the additional alternate Chinese characters 68*b*, the user may toggle through additional sets of candidates as described above, e.g., by actuating arrow keys 43*l* and 43*r* (FIG. 4), keys 52 and 53 (FIGS. 3–5), left and right regions 55*l* and 55*r* of toggle 55 (FIG. 11), or left and right regions 57*l* and 57*r* of toggle 57 (FIG. 12)

To select one of the alternate Chinese characters 68*b*, the user contacts an area of the sensor 50 that correspond to a mapped region of the set of displayed candidates. If the initially selected character candidate to be replaced is not the desired replacement character candidate, the user can modify the selection. Such may be performed by the user moving the pointer, e.g., the user's finger, to the left or the right on the sensor. Confirmation of the replacement text unit candidate to be used is then performed. Such confirmation may be performed as described above, e.g., by actuating up arrow or down arrow 43*u* or 43*l* (FIG. 4 and/or 10), or key 51 (FIG. 5 and/or 10), or the upper directional portion 57*c* of toggle 56 (FIG. 12). Alternatively, confirmation may be performed by actuation of the sensor 50 in a predetermined manner such as maintaining contact on the desired location of the sensor 50 for a predetermined period of time or by a subsequent "tap" of the sensor 50 at the same location.

Figure 18:
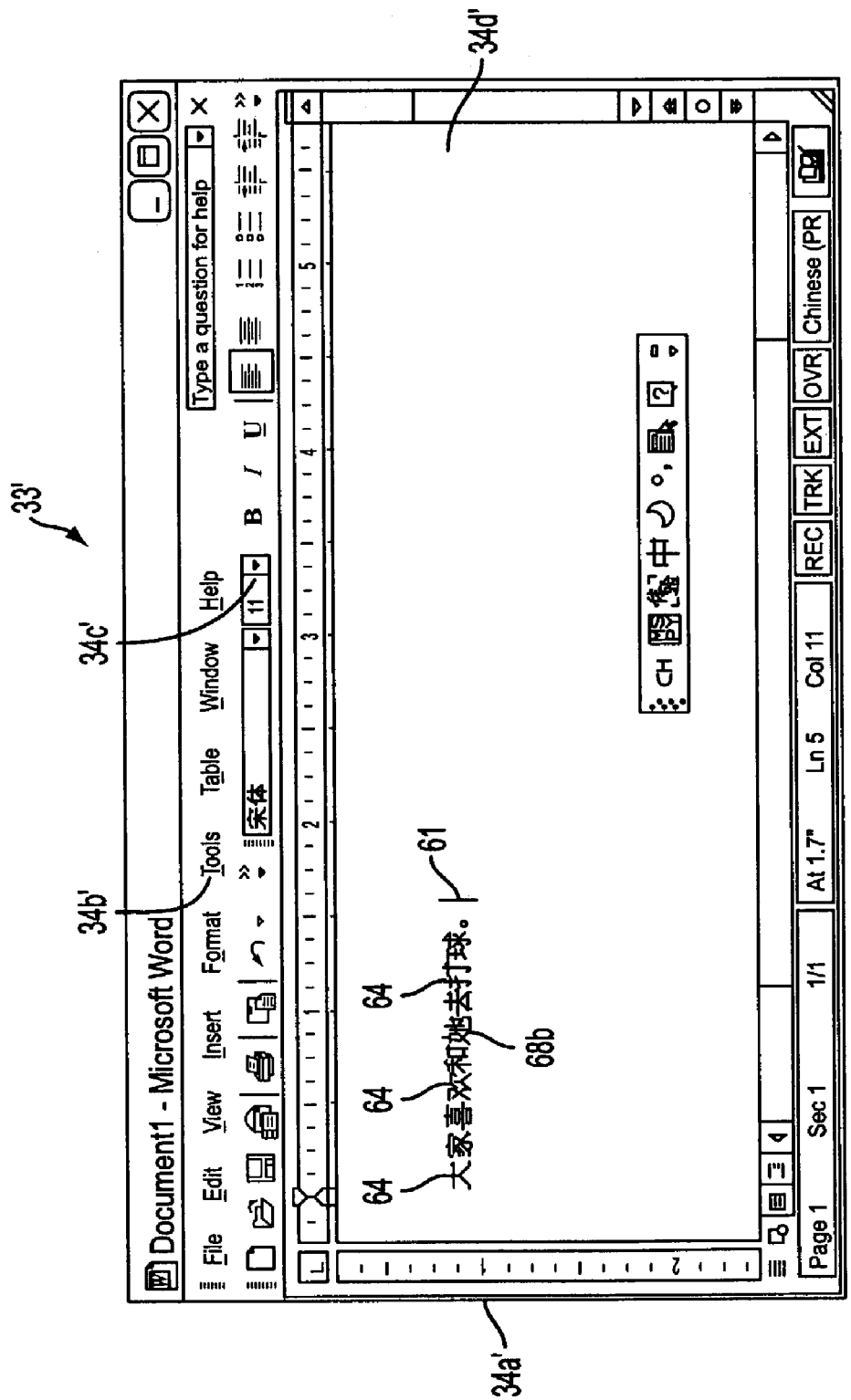
FIG. 18 is a sixth configuration of the second graphical user interface.

Upon confirmation of the desired replacement character 68*b* to be used, the selected character 67 to be replaced is replaced with the selected replacement character candidate 68*b* both at the data level and graphically, and the result of such is shown in FIG. 18. Upon such confirmation, the text unit replacement mode is exited and the user is then returned to the typical data entry and editing mode as is normally used in the word processing program. Upon this return, the cursor 61 is located at its previous location (e.g., at the end of the string of characters). In this location, the individual may merely continue entering characters when the editing process is complete. An advantage of this feature is that the editing process requires a relatively small degree of distraction when compared with conventional editing processes.

Alternatively, in either the word-based or the character-based text unit replacement system, the cursor 61 may be moved to (or immediately adjacent to) the text unit to aid in graphically providing visual feedback of the text unit currently selected to be replaced. However, upon confirmation of the text unit candidate for replacement, or upon a premature exiting from the text unit replacement mode, the cursor 61 is returned back to its prior position immediately before entering the text unit replacement mode which is normally at end of the characters to prepare for the entry of additional Roman characters, as depicted in FIG. 18.

As discussed in the Background of the Invention section, the error rate for an average individual utilizing a QWERTY keyboard for phonics-based Asian language input is approximately 20%. Accordingly, the individual may be required to edit one in five of the Chinese characters that are displayed. The sensor 50 provides a convenient and readily-accessible device for efficiently selecting an incorrect Chinese character and modifying the incorrect Chinese character to the intended character.

The above discussions regarding the editing of characters and text units provided situations where the incorrectly-entered text unit is on the same line as the cursor 61. When the individual contacts the sensor 50, text units located on the same line are selected. Utilizing the sensor 50 to edit text units within a single line is one possible use for the sensor 50. In further embodiments of the invention, the sensor 50 may be utilized to select text units that are within a single sentence, even if the sentence is displayed on multiple lines. The sensor 50 may also be utilized to select text units within a single paragraph or within a single document for example. Accordingly, the sensor 50 may be utilized to edit characters and text units regardless of location on the display screen 31.

When the individual makes contact with the sensor 50, the relative position of the contact with respect to the length of the sensor 50 determines the character or text unit that is selected for editing. To assist the individual with determining the relative position of the finger on the sensor 50, various queues may be added to the input device 40. For example, the housing 41 may have markings corresponding with the various zones printed thereon. In addition, tactile queues, such as shallow protrusions, may be embossed or otherwise placed upon the surface of the sensor 50. As the finger contacts the tactile queues, the individual will gain feedback concerning the position of the finger with respect to the sensor 50.

Figure 19:
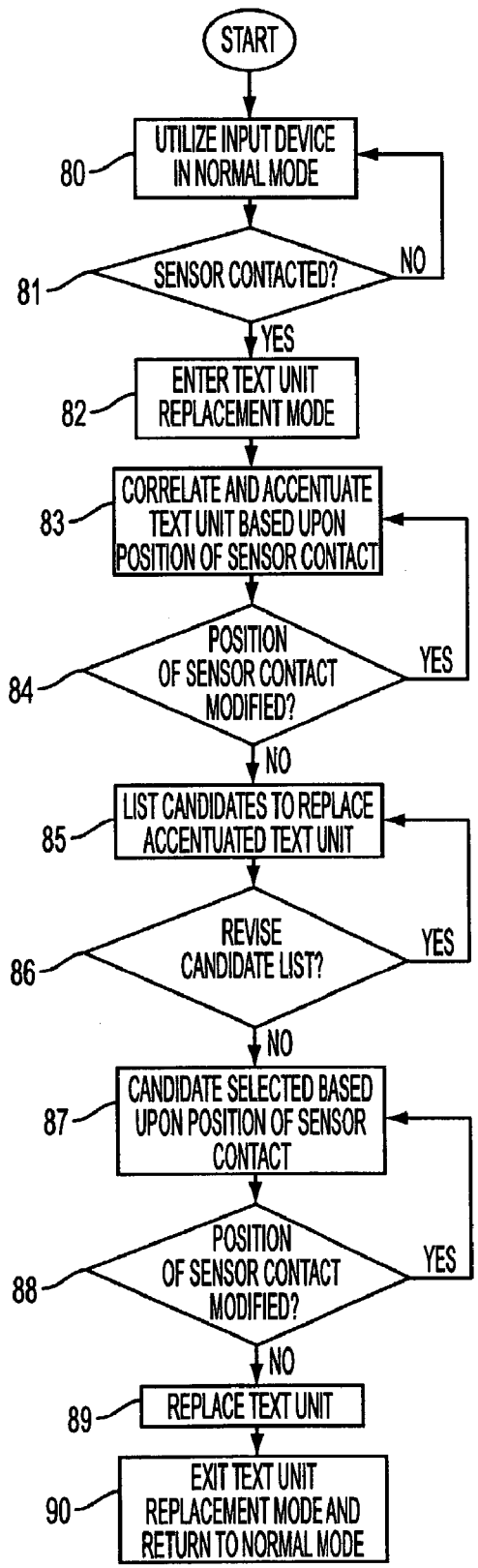
FIG. 19 is a flow diagram illustrating one process of text unit replacement.

Referring to FIG. 19, a flow diagram illustrating the basic process for editing text units is disclosed. Initially, the operating environment 10 is utilized in a normal mode to enter various characters and form text units as is typically done in a word processing software application (step 80). Accordingly, the individual may depress combinations of the keys 43 to display text units on the display screen 31, for example. While operating in the normal mode, the sensor 50 repeatedly detects whether a pointer such as a finger of the user makes contact with the sensor 50 (step 81). If the individual does not make contact with the sensor 50, then the individual continues to operate in the normal mode. If, however, the individual does make contact with the sensor 50, then the operating environment 10 enters the text unit replacement mode (step 82). In the text unit replacement mode, a text unit is selected and accentuated based upon the position of contact with the sensor 50 (step 83). If the position of sensor contact is modified (e.g., if the individual slides the finger relative to the sensor 50), then a different text unit is accentuated based upon the new position of contact with the sensor 50 (step 84). If, however, the position of sensor contact is not modified, as is determined by a confirmation of the selected text unit to be replaced, then various candidates for replacing the accentuated text unit are listed and displayed (step 85). The various listed candidates for replacing the accentuated text unit may reflect the most common replacement candidates. If the desired text unit does not appear within the candidate list, then the candidate list may be revised to list additional candidates (step 86). If, however, the candidate list need not be revised, the individual may select a candidate based upon a position at which contact is made with the sensor 50 (step 87). If the position of sensor contact is modified (e.g., if the individual slides the finger relative to the sensor 50), then a different candidate is selected based upon the new position of contact with the sensor 50 (step 88). If, however, the position of sensor contact is not modified, as is determined by a confirmation of the selected text unit to be replaced, then the text unit is then replaced with the selected text unit candidate (step 89). The application software is then returned to the normal mode (step 90).

The text-based editing system discussed above permits the individual to edit text while drafting a document or otherwise entering text. Accordingly, the individual may proof-read the document while drafting, and make corrections before proceeding to create other portions of the document. The text-based editing system may also be utilized for a plurality of other applications. For example, documents that are scanned with a scanning device are often converted into text documents. Although scan conversion programs are relatively accurate, the conversions may introduce unintended or incorrect text units that must be edited. The text-based editing system discussed above may be utilized, therefore, to edit scanned documents. Furthermore, the text-based editing system may be utilized to edit documents created with voice-recognition software or documents that are translated. With regard to translation, the translation software may select a text unit that is a synonym of the intended text unit, but not the most proper text unit for the context. Accordingly, the text-based editing system may be utilized to replace text units with synonyms.

Figure 20:
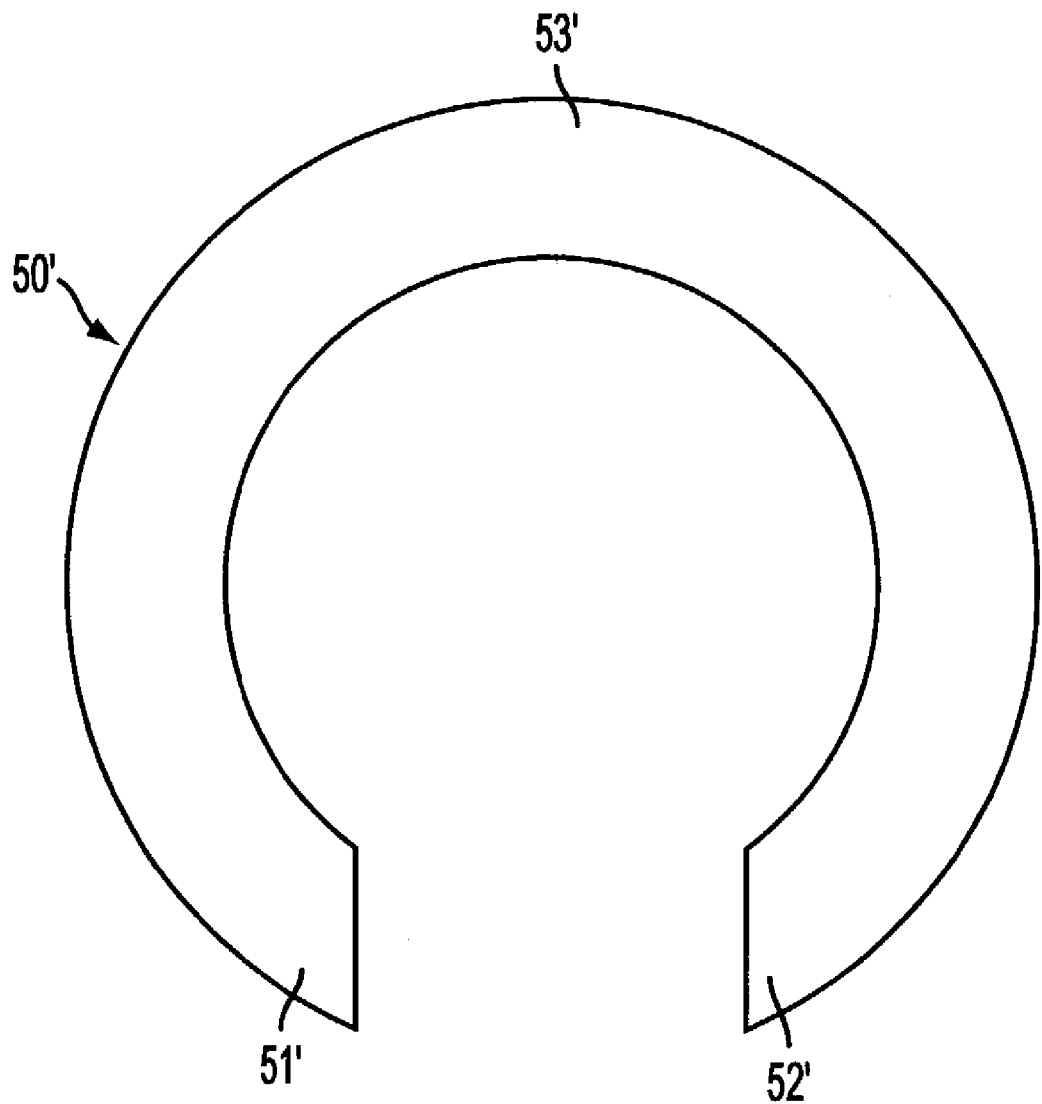
FIG. 20 is a top plan view of a sensor.

In the above material, the sensor 50 is described as having an elongate configuration and being laterally-oriented with respect to the input device 40. In one aspect of the invention, the sensor 50 may have a linear configuration. In a further aspect of the invention, however, the sensor 50 may be curved or may otherwise have a non-linear configuration, yet remain elongate and laterally-oriented. Referring to FIG. 20 a sensor 50' is depicted. The sensor 50' has a generally curved configuration with a first end 51'and a second end 52'. By making contact with the sensor 50' adjacent to the first end 51', text units generally positioned on the left side of the display screen 31 may be selected. Similarly, by making contact with the sensor 50' adjacent to the second end 52', text units generally positioned on the right side of the display screen 31 may be selected. Furthermore, by making contact with the sensor 50' in a central area 53', text units generally positioned in a central area of the display screen 31 may be selected. Accordingly, the various sensor configurations within the scope of the present invention may exhibit a non-linear configuration.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. An input device comprising:
an alphanumeric region having a plurality of depressible keys for entering characters associated with text units that are displayed on a display screen; and
an elongated, laterally-oriented, and touch-sensitive sensor positioned adjacent the alphanumeric region, the sensor having a plurality of zones distributed along a length of the sensor, each zone corresponding with a position at which the text units are rendered on a line of the display screen, and the sensor having a configuration wherein contacting one of the zones transmits a signal for selecting one of the text units positioned at a corresponding location on the line of the display screen.

2. The input device recited in claim 1, wherein the length of the sensor is at least four times a width of the sensor.

3. The input device recited in claim 1, wherein the sensor is positioned behind the alphanumeric region.

4. The input device recited in claim 1, wherein the input device is a keyboard.

5. The input device recited in claim 1, wherein the sensor is positioned adjacent the alphanumeric region.

6. The input device recited in claim 1, further comprising at least one text unit sensor supporting input element to assist in editing the text units.

7. The input device recited in claim 6, wherein the input element includes three discrete keys.

8. The input device recited in claim 6, wherein the input element includes a toggle key.

9. The input device recited in claim 6, wherein the toggle key is a three-way toggle key.

10. The input device recited in claim 1, wherein the zones are unmarked areas along the length of the sensor.

11. The input device recited in claim 1, wherein the sensor is positioned directly behind the alphanumeric region.

* * * * *